United States Patent
Kozin et al.

(10) Patent No.: US 12,284,626 B2
(45) Date of Patent: Apr. 22, 2025

(54) WiFi LOCATION ENHANCEMENT

(71) Applicant: Juniper Networks, Inc., Sunnyvale, CA (US)

(72) Inventors: Vladimir Vladimirovich Kozin, Livermore, CA (US); Kevin Friday, Los Gatos, CA (US); Jie C Jiang, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 453 days.

(21) Appl. No.: 17/644,033

(22) Filed: Dec. 13, 2021

(65) Prior Publication Data

US 2023/0069236 A1    Mar. 2, 2023

Related U.S. Application Data

(60) Provisional application No. 63/236,601, filed on Aug. 24, 2021.

(51) Int. Cl.
*H04W 64/00* (2009.01)

(52) U.S. Cl.
CPC ................... *H04W 64/00* (2013.01)

(58) Field of Classification Search
CPC ......... H04W 64/00; H04W 84/12; G01S 5/14; G01S 5/02213
See application file for complete search history.

(56) References Cited

U.S. PATENT DOCUMENTS

| 7,035,243 B2 * | 4/2006 | Shpak | H04W 88/08 370/537 |
| 8,019,352 B2 * | 9/2011 | Rappaport | H04W 64/00 342/450 |

(Continued)

FOREIGN PATENT DOCUMENTS

| CA | 3033307 C | * | 5/2021 | ........... G06Q 30/016 |
| CN | 108111977 A | * | 6/2018 | ........... H04W 24/02 |
| EP | 3644663 A1 | | 4/2020 | |

OTHER PUBLICATIONS

Thavisak Manodham et al: "A Novel Wireless Positioning System for Seamless Internet Connectivity based on the WLAN Infrastructure", Wireless Personal Communications, Kluwer Academic Publishers, DO, vol. 44, No. 3, Oct. 4, 2007 (Oct. 4, 2007), pp. 295-309, XP019582194. (Year: 2007).*

(Continued)

*Primary Examiner* — Yuwen Pan
*Assistant Examiner* — Swati Jain
(74) *Attorney, Agent, or Firm* — Shumaker & Sieffert, P.A.

(57) ABSTRACT

Techniques are described by which a network management system (NMS) is configured determine a specific wireless channel assigned to a first AP device. The NMS is further configured to determine one or more neighboring AP devices that are within a certain proximity of the first AP device and generate a packetized scan command for each of the one or more neighboring AP devices. The NMS is further configured to send the packetized scan command to each of the one or more neighboring AP devices and receive, from the first AP device and each of the one or more neighboring AP devices, signal samples of a client device connected to the first AP device on the specific wireless channel assigned to the first AP device. The NMS is further configured to, based (Continued)

on the received signal samples, determine a location within the site of the client device.

20 Claims, 12 Drawing Sheets

(56) References Cited

U.S. PATENT DOCUMENTS

| | | | |
|---|---|---|---|
| 9,219,986 B2* | 12/2015 | Pandey | H04W 56/001 |
| 9,591,680 B2* | 3/2017 | Kim | H04W 76/14 |
| 9,661,515 B2* | 5/2017 | Lord | H04W 24/02 |
| 9,729,439 B2 | 8/2017 | MeLampy et al. | |
| 9,729,682 B2 | 8/2017 | Kumar et al. | |
| 9,762,485 B2 | 9/2017 | Kaplan et al. | |
| 9,832,082 B2 | 11/2017 | Dade et al. | |
| 9,871,748 B2 | 1/2018 | Gosselin et al. | |
| 9,985,883 B2 | 5/2018 | MeLampy et al. | |
| 10,200,264 B2 | 2/2019 | Menon et al. | |
| 10,277,506 B2 | 4/2019 | Timmons et al. | |
| 10,432,522 B2 | 10/2019 | Kaplan et al. | |
| 10,756,983 B2 | 8/2020 | Ratkovic et al. | |
| 10,862,742 B2 | 12/2020 | Singh | |
| 10,958,537 B2 | 3/2021 | Safavi | |
| 10,958,585 B2 | 3/2021 | Safavi | |
| 10,985,969 B2 | 4/2021 | Safavi | |
| 10,992,543 B1 | 4/2021 | Rachamadugu et al. | |
| 11,234,254 B2* | 1/2022 | Hareuveni | H04W 72/23 |
| 11,871,242 B2* | 1/2024 | Mahoney | H04B 17/318 |
| 2006/0019679 A1* | 1/2006 | Rappaport | G01S 5/02521 |
| | | | 455/456.1 |
| 2012/0257585 A1* | 10/2012 | Sydor | H04W 72/541 |
| | | | 370/329 |
| 2013/0225165 A1* | 8/2013 | Das | H04W 48/16 |
| | | | 455/434 |
| 2014/0315582 A1* | 10/2014 | Dong | H04W 4/023 |
| | | | 455/456.2 |
| 2015/0219742 A1* | 8/2015 | Castagnoli | G01S 5/0081 |
| | | | 370/336 |
| 2015/0296446 A1* | 10/2015 | Fischer | H04W 52/0254 |
| | | | 370/338 |
| 2015/0304814 A1* | 10/2015 | Pandey | H04W 56/001 |
| | | | 455/456.2 |
| 2016/0088441 A1* | 3/2016 | Mohammad Mirzaei | |
| | | | H04W 40/244 |
| | | | 370/338 |
| 2016/0309474 A1* | 10/2016 | Kneckt | H04L 45/44 |
| 2016/0330579 A1* | 11/2016 | Alizadeh-Shabdiz | |
| | | | G01S 5/021 |
| 2020/0403890 A1 | 12/2020 | McCulley et al. | |
| 2021/0306201 A1 | 9/2021 | Wang et al. | |
| 2021/0368362 A1* | 11/2021 | Rengarajan | H04W 24/02 |
| 2022/0386265 A1* | 12/2022 | Wang | H04L 5/0048 |
| 2023/0105698 A1* | 4/2023 | Lowe | G01S 11/16 |
| | | | 342/451 |

OTHER PUBLICATIONS

Thavisak Manodham et al: "A Novel Wireless Positioning System for Seamless Internet Connectivity based on the WLAN Infrastructure", Wireless Personal Communications, Kluwer Academic Publishers, DO, vol. 44, No. 3, Oct. 4, 2007 (Oct. 4, 2007), pp. 295-309, XP019582194. (Year: 2007) (Year: 2007).*

L. Ribeiro, E. Souto and L. B. Becker, "Multi-Factor Dynamic Channel Assignment approach for Wi-Fi networks," 2018 IEEE Symposium on Computers and Communications (ISCC), Natal, Brazil, 2018, pp. 1-7 (Year: 2018).*

H. Li and Guangjing Chen, "Wireless LAN network management system," 2004 IEEE International Symposium on Industrial Electronics, Ajaccio, France, 2004, pp. 615-620 vol. 1 (Year: 2004).*

Zehl, S., Zubow, A., Doring, M., & Wolisz, A. (2016). ResFi: A secure framework for self organized radio resource management in residential WiFi networks (Year: 2016).*

Response to Extended Search Report dated Jan. 9, 2023, from counterpart European Application No. 22191533.3 filed Sep. 1, 2023, 37 pp.

Extended Search Report from counterpart European Application No. 22191533.3 dated Jan. 9, 2023, 14 pp.

Manodham et al., "A Novel Wireless Positioning System for Seamless Internet Connectivity based on the WLAN Infrastructure", Wireless Personal Communications, vol. 44, No. 3, Oct. 2007, pp. 295-309.

U.S. Appl. No. 17/303,222, filed May 24, 2021, naming inventor Safavi.

Response to Communication pursuant to Article 94(3) EPC dated Feb. 13, 2024, from counterpart European Application No. 22191533.3 filed Jun. 7, 2024, 6 pp.

Communication pursuant to Article 94(3) EPC from counterpart European Application No. 22191533.3 dated Feb. 13, 2024, 10 pp.

* cited by examiner

WiFi LOCATION ENHANCEMENT

This application claims the benefit of U.S. Provisional Patent Application No. 63/236,601, filed 24 Aug. 2021, the entire contents of which is incorporated herein by reference.

TECHNICAL FIELD

The disclosure relates generally to computer networks and, more specifically, to management of wireless networks.

BACKGROUND

Commercial premises, such as offices, hospitals, airports, stadiums, or retail outlets, often include a network of wireless access point (AP) devices installed throughout the premises to provide wireless network services to one or more wireless devices. AP devices enable other devices to wirelessly connect to a wired network using various wireless networking protocols and technologies, such as wireless local area networking protocols conforming to one or more of the IEEE 802.11 standards (i.e., "WiFi"), Bluetooth/Bluetooth Low Energy (BLE), mesh networking protocols such as ZigBee or other wireless networking technologies. Many different types of wireless client devices, such as laptop computers, smartphones, tablets, wearable devices, appliances, and Internet of Things (IoT) devices, incorporate wireless communication technology and can be configured to connect to wireless access points when the device is in range of a compatible wireless access point in order to access a wired network.

SUMMARY

In general, this disclosure describes techniques for determining a location (e.g., a geolocation) of a client device using signal samples (e.g., a received signal strength indication (RSSI)) from an access point (AP) device providing wireless connectivity to the client device and further using signal samples from one or more neighboring AP devices. For example, a site, such as a site for an enterprise, may include a plurality of AP devices configured to provide one or more wireless networks for client devices. A network management system (NMS) may manage the plurality of AP devices, such as by selecting one or more of the AP devices to provide the one or more wireless networks at the site, and configuring each of the selected AP devices to provide access to the one or more wireless networks using a specific wireless channel on which client devices may connect to the respective AP device. In this example, for a given AP device, the NMS may further generate a packetized scan command for each of one or more neighboring AP devices of the given AP device that comprises a scan channel list including at least a specific wireless channel assigned to the given AP device. The NMS may determine a location of a client device connected to the given AP device based on signal samples of the client device on the specific wireless channel that are collected by and received from the given AP device and also from the one or more neighboring AP devices. In this way, the NMS system may accurately determine a location of a client device within a site based on signal samples, which may be available for wireless connections compliant with a protocol (e.g., WIFI).

The techniques of the disclosure may provide one or more technical advantages and practical applications. For example, by relying on signal samples of a client device received from the given AP device that is providing access to the one or more wireless networks for the client device and further received from the one or more neighboring AP devices of the given AP device, an accuracy of determined location of a client device may be increased compared to systems that rely only on signal samples received from the given AP device that is providing access to the one or more wireless networks for the client device. Moreover, the techniques may be applicable to AP devices that use a plurality of antenna to provide the one or more wireless networks for the client device. For example, while the plurality of antennas may be too proximate to each other to accurately determine (e.g., triangulate) a position of the client device, a location engine associated with the NMS may be configured to average samples collected by each antenna of the given AP device to improve an accuracy of the signal sample provided to the NMS. The location engine of the NMS then further combines the average samples received from each of the given AP device and the one or more neighboring AP devices for the client device to determine an accurate location of the client device within the site. In this way, the NMS may determine a location of the client device without relying on a sufficient separation of antennas of a single AP device providing one or more wireless networks for the client device.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Some systems are configured to estimate location of a WiFi client device based on relative power of the received signal collected on a single access point (AP) device with which the client device is connected. Such systems may generate a radial estimate of the position of the client device with respect to the single AP, but cannot more accurately pinpoint the client device location without using a special antenna configuration or special signal processing.

In accordance with the techniques of the disclosure, a scan policy manager (SPM), as a backend service of a network management system (NMS) configured to manage a plurality of AP devices at a site, may be configured to monitor a current assignment of wireless channels and to instruct neighboring AP devices to listen to the specific wireless channel using one or more monitoring radios. The SPM may create a scan group for a first AP device that includes the first AP device and its neighboring AP devices based on proximity. The SPM may determine the specific wireless channel assigned to the first AP device, and may create a scan channel list for each of the neighboring AP devices that includes the specific wireless channel. The SPM may send a packetized scan command including the scan channel list to each of the neighboring AP devices instructing each of the neighboring AP devices to scan the specific wireless channel and may send the signal samples to a location engine associated with the NMS. This is data that may not otherwise be collected as the specific wireless channel would not be monitored by the neighboring AP, as instructed by the SPM. The additional samples from multiple different AP device perspectives may enable the location engine to determine a location of the client device more accurately. The SPM may manage the targeted scanning for each of the AP devices within the site, where each AP device may be a neighboring AP device for one or more other AP devices. In practice, therefore, the scan channel list for a given AP device may be unique to that AP device and may include multiple additional channels to be scanned based on the other AP devices for which the given AP device is a neighboring AP device.

Techniques described herein may represent one or more solutions that may be distinguished from the radio resource manager (RRM) periodically instructing all AP devices of a site to scan all channels (for purposes of assigning channels to AP devices). The RRM process is cumbersome and expensive as it interrupts normal operation of the AP devices and collects a large amount of data. The SPM solution provides targeted scanning that identifies a few additional channels for each AP device to scan. In addition, a firmware update at each of the AP devices enables the AP devices to understand the scan command parameters and to integrate the scanning of the few additional channels into the AP device's regular functions.

Figure 1A:
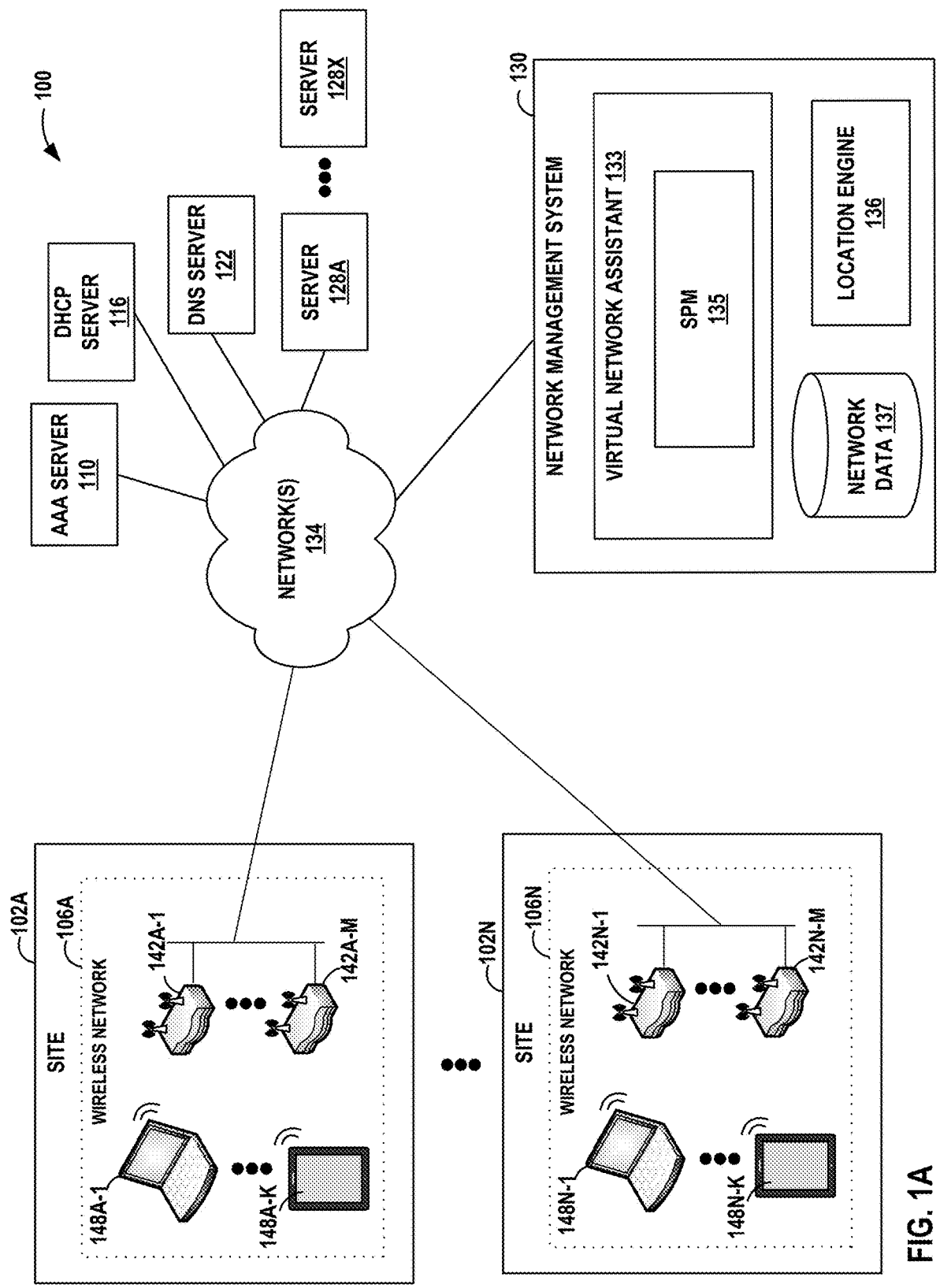
FIG. 1A is a block diagram of an example network system configured to determine a location of a client device based on received signal samples, in accordance with one or more techniques of the disclosure.

FIG. 1A is a diagram of an example network system 100 configured to determine a location of a client device based on received signal samples, in accordance with one or more techniques of the disclosure. Example network system 100 includes a plurality sites 102A-102N at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect.

Sites 102, such as enterprises, offices, hospitals, airports, stadiums, or retail outlets, often install complex wireless network systems, including a network of wireless access point (AP) devices, e.g., AP devices 142, throughout the premises to provide wireless network services to one or more wireless client devices. In this example, site 102A includes a plurality of AP devices 142A-1 through 142A-N. Similarly, site 102N includes a plurality of AP devices 142N-1 through 142N-N. Each AP device 142 may be any type of wireless access point, including, but not limited to, a commercial or enterprise access point, a router, or any other device capable of providing wireless network access.

Each site 102A-102N also includes a plurality of client devices, otherwise known as user equipment devices (UEs), referred to generally as client devices 148 or UEs 148, representing various wireless-enabled devices within each site. For example, a plurality of UEs 148A-1 through 148A-N are currently located at site 102A. Similarly, a plurality of UEs 148N-1 through 148N-N are currently located at site 102N. Each UE 148 may be any type of wireless client device, including, but not limited to, a mobile device such as a smartphone, tablet or laptop computer, a personal digital assistant (PDA), a wireless terminal, a smart watch, smart ring or other wearable device. UEs 148 may also include IoT client devices such as printers, security devices, environmental sensors, appliances, or any other device configured to communicate over one or more wireless networks.

Example network system 100 also includes various networking components for providing networking services within the wired network including, as examples, an Authentication, Authorization and Accounting (AAA) server 110 for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128 (e.g., web servers, databases servers, file servers and the like), and a network management system (NMS) 130. NMS 130 may comprise a radio resource manager (RRM). As shown in FIG. 1A, the various devices and systems of network 100 are coupled together via one or more network(s) 134, e.g., the Internet and/or an enterprise intranet. Each one of the servers 110, 116, 122 and/or 128, AP devices 142, UEs 148, NMS 130, and any other servers or devices attached to or forming part of network system 100 may include a system log or an error log module wherein each one of these devices records the status of the device including normal operational status and error conditions.

In the example of FIG. 1A, NMS 130 is a cloud-based computing platform that manages wireless networks 106A-106N at one or more of sites 102A-102N. As further described herein, NMS 130 provides an integrated suite of wireless network management tools and implements various techniques of the disclosure.

NMS 130 may monitor network data associated with wireless networks 106A-106N at each site 102A-102N, respectively, to deliver a high-quality wireless network experience to end users, IoT devices and clients at the site. The network data may be stored in a database, such as database 137 within NMS 130 or, alternatively, in an external database. In general, NMS 130 may provide a cloud-based platform for network data acquisition, monitoring, activity logging, reporting, predictive analytics, network anomaly identification, and alert generation.

NMS 130 observes, collects and/or receives network data 154 for a variety of client devices, such as SDK clients, named assets, and/or client devices connected/unconnected to the wireless network. The network data is indicative of one or more aspects of wireless network performance. Network data 154 may take the form of data extracted from messages, counters and statistics, for example. The network data may be collected and/or measured by one or more UEs 148 and/or one or more AP devices 142 in a wireless network 106. Some of the network data 154 may be collected and/or measured by other devices in the network system 100. In accordance with one specific implementation, a computing device is part of NMS 130. In accordance with other implementations, NMS 130 may comprise one or more computing devices, dedicated servers, virtual machines, containers, services or other forms of environments for performing the techniques described herein.

NMS 130 may include a virtual network assistant (VNA) 133 that analyzes network data received from one or more UEs 148 and/or one or more AP devices 142 in a wireless network, provides real-time insights and simplified troubleshooting for IT operations, and automatically takes remedial action or provides recommendations to proactively address wireless network issues. VNA 133 may, for example, include a network data processing platform configured to process hundreds or thousands of concurrent streams of network data from UEs 148, sensors and/or agents associated with AP devices 142 and/or nodes within network 134. For example, VNA 133 of NMS 130 may include a network performance engine that automatically determines one or more service level exception (SLE) metrics for each client device 148 in a wireless network 106. SLE metrics determined based on the collected network data can be used to measure various aspects of wireless network performance. SLE metrics seek to measure and understand network performance from the viewpoint of the end user experience on the network. One example SLE metric is a coverage metric, which tracks the number of user minutes that a client device's received signal strength indicator (RSSI) as measured by an access point with which the client is associated is below a configurable threshold. Another example SLE metric is a roaming metric, which tracks a client's percentage of successful roams between two access points that are within prescribed latency (e.g., time-based) thresholds. Other example SLE metrics may include time to connect, throughput, successful connects, capacity, AP health, and/or any other metric that may be indicative of one or more aspects of wireless network performance. The SLE metrics may also include parameters such as an RSSI of a received wireless signal as measured by the client device, a signal-to-noise ratio (SNR) of the wireless signal as measured by the client device, etc. The thresholds may be customized and configured by the wireless network service provider to define service level expectations at the site. The network service provider may further implement systems that automatically identify the root cause(s) of any SLE metrics that do not satisfy the thresholds, and/or that automatically implement one or more remedial actions to address the root cause, thus automatically improving wireless network performance.

VNA 133 may also include an underlying analytics and network error identification engine and alerting system. VNA 133 may further provide real-time alerting and reporting to notify administrators or IT personnel of any predicted events, anomalies, trends, and may perform root cause analysis and automated or assisted error remediation.

In some examples, VNA 133 of NMS 130 may apply machine learning techniques to identify the root cause of error conditions or poor wireless network performance metrics detected or predicted from the streams of event data. VNA 160 may generate a notification indicative of the root cause and/or one or more remedial actions that may be taken to address the root cause of the error conditions or poor wireless network performance metrics. In some examples, if the root cause may be automatically resolved, VNA 160 invokes one or more remedial or mitigating actions to address the root cause of the error condition or poor wireless network performance metrics, thus automatically improving the underlying wireless network performance metrics (e.g., one or more SLE metrics) and also automatically improving the user experience of the wireless network.

Computational resources and components implementing VNA 160 may be part of the NMS 130, may execute on other servers or execution environments, or may be distributed to nodes within network 134 (e.g., routers, switches, controllers, gateways and the like). Example details of these and other operations implemented by the VNA 160 and/or NMS 130 are described in U.S. application Ser. No. 14/788,489, filed Jun. 30, 2015, and entitled "Monitoring Wireless Access Point Events," U.S. application Ser. No. 16/835,757, filed Mar. 31, 2020, and entitled "Network System Fault Resolution Using a Machine Learning Model," U.S. application Ser. No. 16/279,243, filed Feb. 19, 2019, and entitled "Systems and Methods for a Virtual Network Assistant," U.S. application Ser. No. 16/237,677, filed Dec. 31, 2018, and entitled "Methods and Apparatus for Facilitating Fault Detection and/or Predictive Fault Detection," U.S. application Ser. No. 16/251,942, filed Jan. 18, 2019, and entitled "Method for Spatio-Temporal Modeling," U.S. application Ser. No. 16/296,902, filed Mar. 8, 2019, and entitled "Method for Conveying AP Error Codes Over BLE Advertisements," and U.S. application Ser. No. 17/303,222, filed May 24, 2021, and entitled, "Virtual Network Assistant Having Proactive Analytics and Correlation Engine Using Unsupervised ML Model," all of which are incorporated herein by reference in their entirety.

In accordance with the techniques described in this disclosure, VNA 133 may include a scan policy manager (SPM) 135 to determine one or more neighboring AP devices of a given AP device, e.g., AP device 142A-1, that are within a certain proximity of AP device 142A-1 and to generate a packetized scan command for each of the one or more neighboring AP devices. For example, VNA 133 may determine a specific wireless channel assigned to a servicing radio of AP device 142A-1, e.g., by a radio resource manager as a backend service of NMS 130, on which client devices 148A-1 through 148A-K may connect to AP device 142A-1. In this example, SPM 135 may determine one or more neighboring AP devices of AP device 142A-1 within site 102A that are within a certain proximity of AP device 142A-1. For instance, SPM 135 may determine AP device 142A-K is within a certain proximity of AP device 142A-1.

For example, when a new instance of the PACE backend service starts, system 100 may use the following config parameters: Org Id, Map Id (from a config file); and current RF Channel configuration for 2.4 and 5 GHz bands (e.g., by making REST GET from PAPI /internal/sites/:siteId/devices/rrm/:band). After getting config parameters, SPM 135 may internally assign scan groups. A scan group is a set of neighbor APs that are put under the control of a channel scan procedure. For example, SPM 135 may perform the group selection based on geometrical proximity of AP devices (e.g., a configurable min and max distance between the APs) and based further on channel selection set by the RRM. At run time, SPM 135 may listen for possible updates for RRM and AP device placement and reassign the scan groups and/or generate statistics for observability.

The following factors may affect forming of scan group for each WLAN/Band. SPM 135 may assign a primary AP device and secondary AP devices (with regards to the scanning procedure). SPM 135 may determine the one or more neighboring AP devices using a geometrical proximity. For a given AP device (e.g, AP device 142A-1), SPM 135 may select several neighboring AP devices withing a certain annulus (e.g., between a minimum radius (Rmin) and a maximum radius (Rmax) from the given AP device). SPM 135 may reduce the selected neighboring AP devices to be between a minimum number (nNbrMin) and a maximum number (nNbrMax). For example, with nNbrMin=2 and nNbrMax=4, SPM 135 may select the one or more neighboring AP devices to be not less than 2 AP devices and not more than 4 AP devices. After determining the one or more neighboring AP devices (e.g., forming a scan group), SPM 135 may check that the number of channels to scan does not exceed a threshold (e.g. nScanChannels24<nScanChannels24Max), for example, based on the current RRM settings for each AP of the one or more neighboring AP devices. For example, when nChannels24Max=4 and nChannels5Max=4, and if the required number of channels exceeds the threshold, only a few number of groups of neighboring AP devices will be formed, at random. SPM 135 may use provider application programming interface (PAPI) (e.g., REST GET of PAPI) to learn the site topology to determine AP device locations.

SPM 135 may generate a packetized scan command for each of the one or more neighboring AP devices that comprises a scan channel list including at least the specific wireless channel for AP device 142A-1. The scan channel list for a respective neighboring AP device may comprise wireless channels that are not assigned (e.g, by a radio resource manager) to the respective neighboring AP device. For instance, SPM 135 may generate a packetized scan command for AP device 142-K that includes the specific wireless channel for AP device 142A-1 when AP device 142A-K is not assigned the same specific wireless channel for connecting client devices 148 to networks 134.

Each channel may be associated with one or more of the following parameters: (1) a channel number and/or channel bandwidth (e.g., channel 108, 40 MHz); (2) a scan interval, in msec (for example: 300 msec); and a band (e.g., 2.4 GHz or 5 GHz), which may be derived from the channel number. The number of channels to scan may be limited (e.g., 3 . . . 6) and may depend on the current RRM configuration. In some examples, there is no "hard" limit to the number of channels to scan. While the above example uses a scan interval of 300 msec per channel, there is no hard limit on the scan duration per channel. The list of channels to scan may be set by the backend service, e.g., SPM 135. To set the list, SPM 135 may send a command to a framework for storing, reading and analyzing data (e.g., streaming data), such as, for example, a Kafka topic, (e.g., with a key being the AP MAC), this message may be parsed by the Event-Property-Tagger (EPT) and interpreted as a command for a specific AP device. The AP device may receive the scan command with parameters via a web socket (WS) connection established between the AP device and the EPT. Once applied, the AP device may run the scan command indefinitely long (e.g., until the AP device restarts).

SPM 135 may not collect signal samples (e.g., RSSI) by itself. In some examples, signal samples may be collected and processed by another existing service, for instance, location engine 136. For example, location engine 136 may not receive signal samples from neighboring AP devices not assigned to the specific channel if SPM 135 does not instruct each neighboring AP device to perform a scan on a monitoring radio. That is, each one of AP devices 142 may include one or more serving radios and one or more monitoring radios. For instance, a wireless chipset of each one of AP devices 142 may include several kinds of receiver channels, called (1) serving and (2) monitoring. Monitoring radios of each one of AP devices 142 may monitor channels independently and concurrently, for reception only. The monitoring radio of AP devices 142 may scan the channels (e.g., with a monitoring radio), which may be different from the primary channel assigned to the AP device by RRM.

Example system-level requirements for SPM 135 may include one or more of the following. SPM 135 may apply the scan command asynchronously. Effectively, the list of scan channels may follow the most recent RRM configuration. At a site level, SPM 135 may run periodically at a configurable interval, for example, every 2-5 minutes. For the location services, each AP device may report the signal samples (e.g., RSSI values) for each unconnected client device, for example, every 10 seconds or more frequently. Gaps in the signal samples beyond 30 seconds may be mitigated, for example, using a tickling process of FIG. 8. In this way, scans by the AP device may not be preempted by other scans performed on the AP device.

SPM 135 may send the packetized scan command to each of the one or more neighboring AP devices instructing each of the one or more neighboring AP devices to scan at least the specific wireless channel included in the scan channel list. For instance, SPM 135 may output the packetized scan command to AP device 142A-K instructing AP device 142A-K to continuously scan (e.g., according to a determined scan interval) the specific wireless channel. A location engine 136 may receive, from AP device 142A-1 and each of the one or more neighboring AP devices, signal samples of a client device connected to AP device 142A-1 on the specific wireless channel assigned to AP device 142A-1. For example, location engine 136 may receive, from AP device 142A-1 and AP device 142A-K, signal samples of client device 148A-1 for at least the specific wireless channel assigned to AP device 142A-1.

Based on the received signal samples, location engine 136 may determine a location within site 102A of client device 148A-1 connected to AP device 142A-1 on the specific wireless channel. For example, location engine 136 may triangulate the location using RSSI values received from AP device 142A-1 and the neighboring AP devices, e.g., AP device 142A-K. For instance, location engine 136 may receive an RSSI value (e.g., decibel-milliwatt (dBm)) for at least the specific wireless channel assigned to AP device 142A-1 from AP device 142A-1 and the neighboring AP devices, e.g., AP device 142A-K. In this example, location engine 136 may determine, for each RSSI value, a size (e.g., distance in meters) of a radial zone for client device 148A-1 from each respective AP device. Location engine 136 may determine an overlap area of the radial zones generated using each RSSI value to determine the location (e.g., a specific location) of client device 148A-1 within site 102A.

Location engine 136 may receive the signal samples (e.g., RSSI values) with an associated media access control (MAC) address or other identifier. For example, location engine 136 may receive the signal samples and the MAC address for client device 148A-1 from AP device 142A-1 and each of the one or more neighboring AP devices. Location engine 136 may map the signal samples for that client device on the channel. For example, location engine

136 may map the signal samples to client device 148A-1. In some examples, the data sent from the AP devices may include, for example, MAC address of a client device, signal samples (e.g., RSSI values) from each antenna and timestamp of when the signal samples were taken. Location engine 136 may associate the signal samples with the MAC address of the client device, antenna, and timestamp of when the signal samples were taken. For example, location engine 136 may bundle a plurality of the signal samples into a group corresponding to a predetermined period of time (e.g., a 30 second period of time). For example, location engine 136 may bundle signal samples for client device 148A-1 that were taken in a 30 second period of time from AP device 142A-1 and each of the one or more neighboring AP devices. In this example, location engine 136 may determine the location of client device 148A-1 during the predetermined period of time based on the bundled signal samples that were taken during the predetermined period of time.

SPM 135 may further be configured to display an indication of the determined location. For example, SPM 135 may generate data representative of a graphical user interface (GUI) for display on a computing device. In some examples, the data includes a representation of a map of the site 102A. In response to a determination of the location of client device 148A-1, SPM 135 may generate an indicator of client device 148A-1 positioned on a map of site 102A based on the determined location of client device 148A-1 within site 102A. The indicator may be represented using a first color that is different than a second color used to indicate a location of another client device within site 102A (e.g., client device 148A-K) determined based only on signal samples received from a single AP device to which client device 148A-K is connected. In other examples, other indicators may be used to represent and distinguish between client devices with locations determined based on multi-AP device signal samples and other client devices with locations determined based on single-AP device signal samples.

NMS 130 (e.g., SPM 135) may use Consul cloud services available in each environment to store the current settings (e.g., both inputs and the current derived values) as follows.
Scope: configurable per Organization/Map/WLAN:
allowList|disallowList
Min/Max distance between the APs within the PACE group:
for example: distanceMin=5/distanceMax=20 [meters]
Min/Max number of APs in Group:
for example: nNbrMin=3, nNbrMax=4
Min Geometrical Coverage for client location:
for example: coverageMinPercent=25 (=25%, given the AP placement and the number of APs in the group, NMS 130 can get more than 25% probability of getting 3+ RSSI readings on different APs in the group)
Max number of WLANs associations for the AP when the PACE group formation is still possible
for example, nWLANMax=2. If the AP device belongs to more than 2 WLANs, the AP device will not be a part of the PACE group.
Max number of channels to scan (note both 2.4 and 5 GHz channels are added) for example, nChanMax=8. NMS 130 may require that the number of channels to scan should not exceed eight (8), otherwise there is no significant benefits for the targeted scan
Max interval to check for configuration changes. The Site/Map/RRM settings may change anytime, and NMS 130 may recalculate the SPM group membership and the scanning parameters. NMS 130 may listen for RRM events to change channel assignment.
for example, with configUpdateMinSec=120 and configUpdateMax=600 the group membership may be revised not sooner than 2 min after the most recent change, and NMS 130 may attempt to rebuild the groups every 10 minutes even if there is no update (still pulling the PAPI every 10 min for specific maps and RRM settings).

Figure 1B:
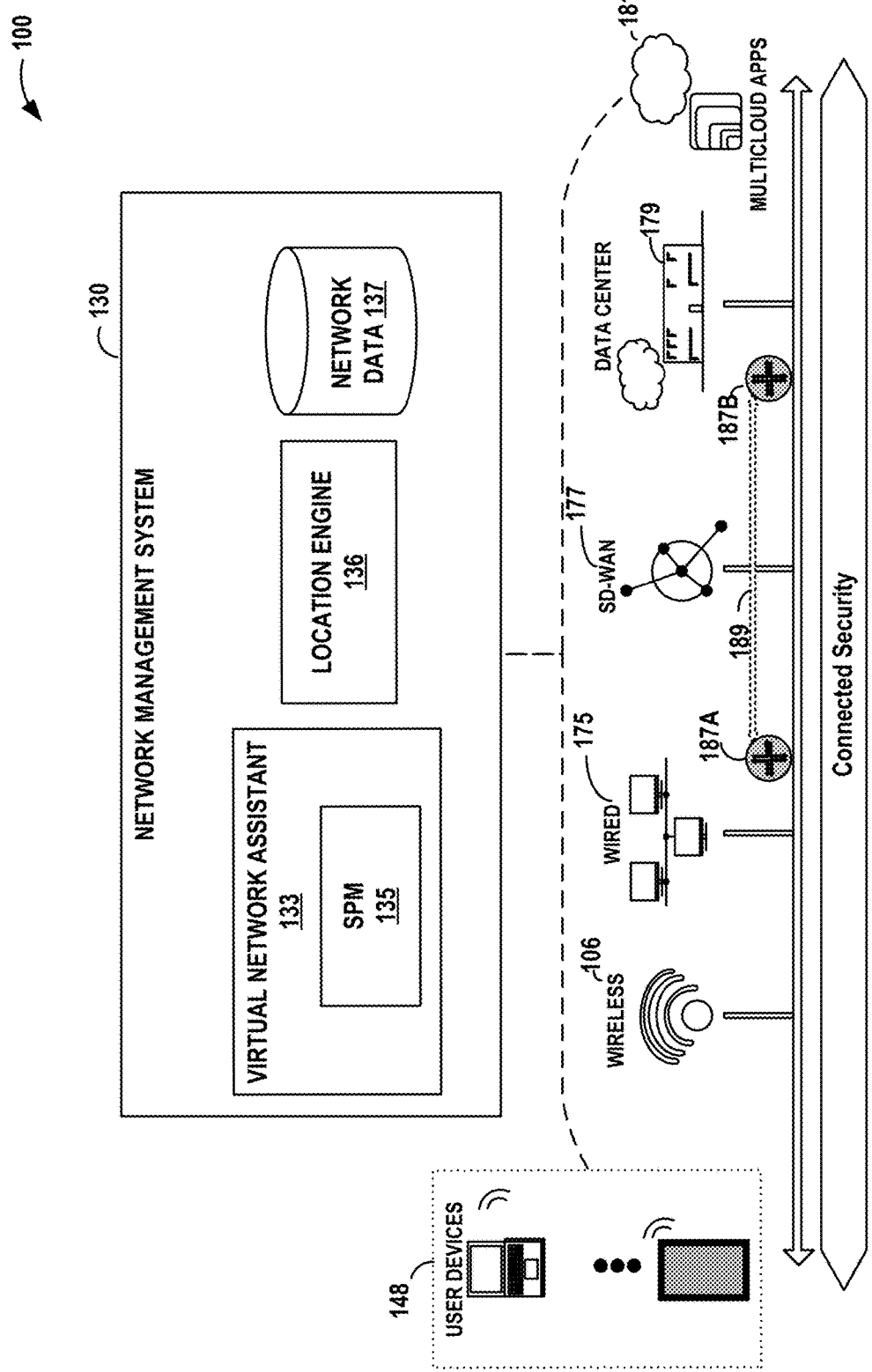
FIG. 1B is a block diagram illustrating further example details of the network system of FIG. 1A.

FIG. 1B is a block diagram illustrating further example details of the network system of FIG. 1A. In this example, FIG. 1B illustrates NMS 130 configured to operate according to an artificial intelligence/machine-learning-based computing platform providing comprehensive automation, insight, and assurance (WiFi Assurance, Wired Assurance and WAN assurance) spanning from wireless network 106 and wired LAN 175 networks at the network edge (far left of FIG. 1B) to cloud-based application services 181 hosted by computing resources within data centers 179 (far right of FIG. 1B).

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, NMS 130 may be configured to proactively monitor and adaptively configure network 100 so as to provide self-driving capabilities. Moreover, VNA 133 includes a natural language processing engine to provide AI-driven support and troubleshooting, anomaly detection, AI-driven location services, and AI-drive RF optimization with reinforcement learning.

As illustrated in the example of FIG. 1B, AI-driven NMS 130 also provides configuration management, monitoring and automated oversight of software defined wide-area network (SD-WAN) 177, which operates as an intermediate network communicatively coupling wireless networks 106 and wired LANs 175 to data centers 179 and application services 181. In general, SD-WAN 177 provides seamless, secure, traffic-engineered connectivity between "spoke" routers 187A of edge wired networks 175 hosting wireless networks 106, such as branch or campus networks, to "hub" routers 187B further up the cloud stack toward cloud-based application services 181. SD-WAN 177 often operates and manages an overlay network on an underlying physical Wide-Area Network (WAN), which provides connectivity to geographically separate customer networks. In other words, SD-WAN 177 extends Software-Defined Networking (SDN) capabilities to a WAN and allows network(s) to decouple underlying physical network infrastructure from virtualized network infrastructure and applications such that the networks may be configured and managed in a flexible and scalable manner.

In some examples, underlying routers of SD-WAN 177 may implement a stateful, session-based routing scheme in which the routers 187A, 187B dynamically modify contents of original packet headers sourced by user devices 148 to steer traffic along selected paths, e.g., path 189, toward application services 181 without requiring use of tunnels and/or additional labels. In this way, routers 177A, 177B may be more efficient and scalable for large networks since the use of tunnel-less, session-based routing may enable routers 177A, 177B to achieve considerable network resources by obviating the need to perform encapsulation and decapsulation at tunnel endpoints. Moreover, in some examples, each router 177A, 177B may independently perform path selection and traffic engineering to control packet flows associated with each session without requiring use of a centralized SDN controller for path selection and label distribution. In some examples, routers 177A, 177B implement session-based routing as Secure Vector Routing (SVR), provided by Juniper Networks, Inc.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

In some examples, AI-driven NMS 130 may enable intent-based configuration and management of network system 100, including enabling construction, presentation, and execution of intent-driven workflows for configuring and managing devices associated with wireless networks 106, wired LAN networks 175, and/or SD-WAN 177. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

Figure 2:
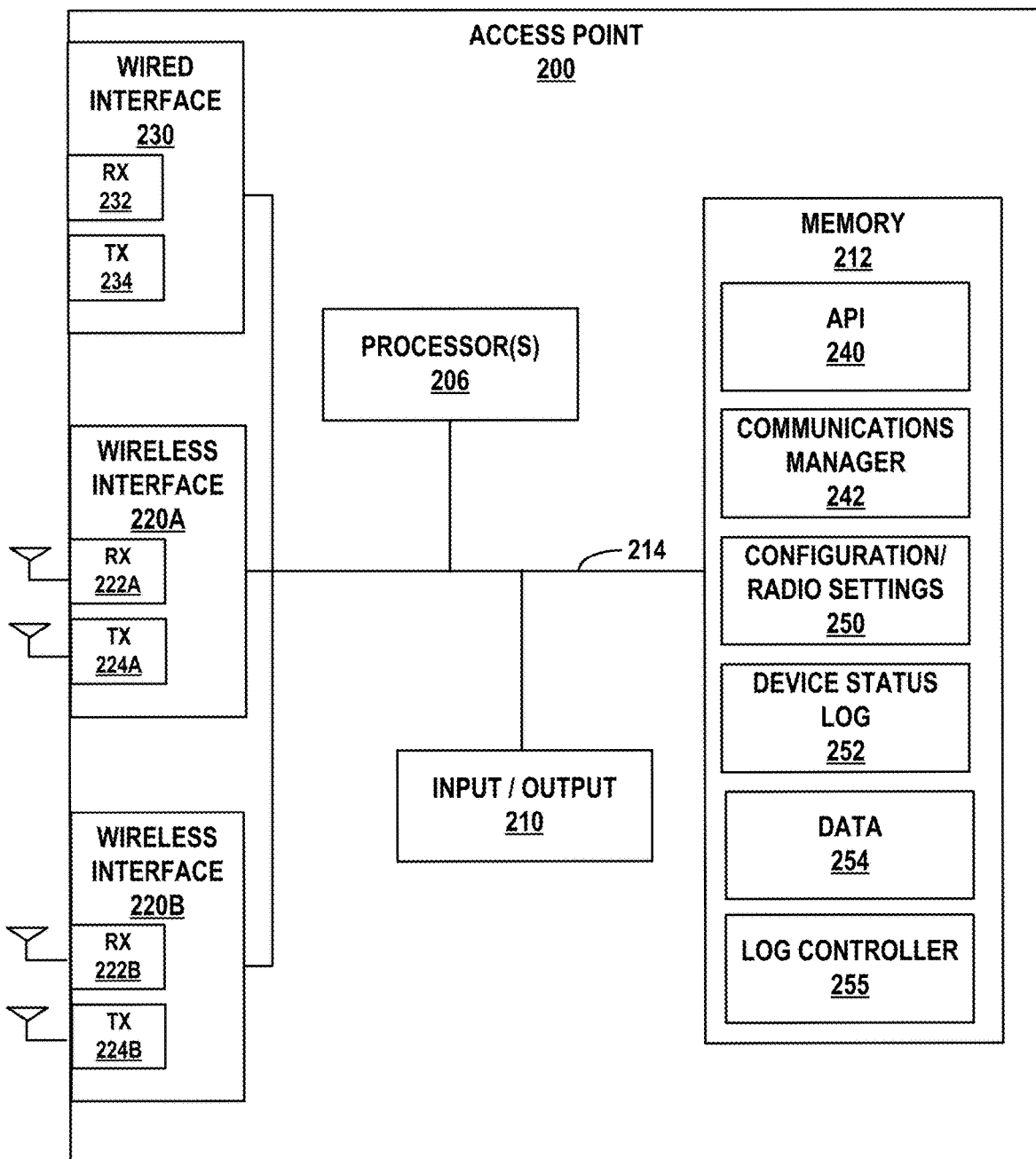
FIG. 2 is a block diagram of an example access point device in accordance with one or more techniques of the disclosure.

FIG. 2 is a block diagram of an example access point (AP) device 200 configured in accordance with one or more techniques of the disclosure. Example AP device 200 shown in FIG. 2 may be used to implement any of AP devices 142 as shown and described herein with respect to FIG. 1A. Access point device 200 may comprise, for example, a Wi-Fi, Bluetooth and/or Bluetooth Low Energy (BLE) base station or any other type of wireless access point. In some examples, access point device 200 may be compliant with a Wi-Fi but may not be configured for Bluetooth or BLE.

In the example of FIG. 2, access point device 200 includes a wired interface 230, wireless interfaces 220A-220B, one or more processor(s) 206, memory 212, and a user interface 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, access point device 200 to network(s) 134 of FIG. 1A. First and second wireless interfaces 220A and 220B represent wireless network interfaces and include receivers 222A and 222B, respectively, each including a receive antenna via which AP device 200 may receive wireless signals from wireless communications devices, such as UEs 148 of FIG. 1A. First and second wireless interfaces 220A and 220B further include transmitters 224A and 224B, respectively, each including transmit antennas via which AP device 200 may transmit wireless signals to wireless communications devices, such as UEs 148 of FIG. 1A. In some examples, first wireless interface 220A may include a Wi-Fi 802.11 interface (e.g., 2.4 GHz and/or 5 GHz) and second wireless interface 220B may include a Bluetooth interface and/or a Bluetooth Low Energy (BLE) interface. However, these are given for example purposes only, and the disclosure is not limited in this respect.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform one or more of the techniques described herein.

Memory 212 includes one or more devices configured to store programming modules and/or data associated with operation of access point device 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform one or more of the techniques described herein.

In this example, memory 212 stores executable software including an application programming interface (API) 240, a communications manager 242, configuration settings 250, a device status log 252 and data storage 254. Device status log 252 includes network data, e.g., a list of network parameters and/or network events, specific to AP device 200 and/or client devices currently or previously associated with AP device 200. The network data may include, for example, any network parameter and/or network data indicative of one or more aspects of performance of the wireless network or of the AP device 200 itself. In some examples, the network data may include a plurality of states measured periodically as time series data. The network data may be measured by the UE devices 148 and transmitted to AP device 200, may be measured by AP device 200 itself or by any other device associated with the wireless network and transmitted to AP device 200.

Network data stored in data storage 254 may include, for example, AP events and/or UE events. In some examples, the network events are classified as positive network events, neutral network events, and/or negative network events. The network events may include, for example, memory status, reboot events, crash events, Ethernet port status, upgrade failure events, firmware upgrade events, configuration changes, authentication events, DNS events, DHCP events, one or more types of roaming events, one or more types of proximity events, etc., as well as a time and date stamp for each event. Log controller 255 determines a logging level for the device based on instructions from NMS 130. Data 254 may store any data used and/or generated by access point device 200, including data collected from UEs 148, such as proximity information used to determine proximity of client devices relative to proximity zones of AP devices, that is transmitted by access point device 200 for cloud-based management of wireless networks 106A by NMS 130. For example, AP device 200 may detect a UE 148 is within range of its wireless signal and store proximity information associated with the UE 148 in data 254. For example, AP device 200 may store an identifier of UE 148 and the RSSI value of UE 148 in data 254. In some examples, AP device 200 may store an identifier for AP device 200 in data 254.

In response to receiving a packetized scan command, AP device 200 may scan each channel in a scan channel list indicated by the packetized scan command. AP device 200 may receive or collect signal samples (e.g., RSSI values) of client devices for communications on each channel in the scan channel list. AP device 200 may aggregate the signal samples collected for each of the client devices on each channel and output the aggregated signal samples. For example, AP device 200 may output the aggregated signal samples to a location engine associated with NMS 130. AP device 200 may scan a particular channel in the scan channel list during an associated scan interval for the particular channel (e.g., 300 ms). In some examples, AP device 200 may be configured to apply updated firmware at AP device 200 to understand the scan command and to incorporate the additional channel scans into normal operation.

Communications manager 242 includes program code that, when executed by processor(s) 206, allow AP device 200 to communicate with UEs 148 and/or network(s) 134 via any of interface(s) 230 and/or 220A-220B. Configuration settings 250 include any device settings for AP device 200 such as radio settings for each of wireless interface(s) 220A-220B. These settings may be configured manually or may be remotely monitored and/or automatically managed or configured by NMS 130 to optimize wireless network performance on a periodic (e.g., hourly or daily) basis.

Input/output (I/O) 210 represents physical hardware components that enable interaction with a user, such as buttons, a touchscreen, a display and the like. Although not shown, memory 212 typically stores executable software for controlling a user interface with respect to input received via I/O 210.

For Wifi location, AP device 200 may determine the AP device neighbor channels to monitor automatically from the AP device's Basic Service Set Identifier. (BSSID) list. SPM 135 may perform the following:
  gather information from a RRM and determine the list of AP Neighbor channels to scan for each AP device on a site. SPM 135 may publish the AP neighbor channel scan list to a topic for AP device 200. AP device 200 may subscribe to the topic and set the neighbor channel scan list accordingly.
  insure that adequate neighbor channel scan coverage is maintained by AP devices 142 on a site. For instance, for four AP devices in close proximity, SPM 135 may provide neighbor scan coverage for all AP devices and not come up with a list where an AP device is never scanned.
  For cases when there is no AP Neighbor Scan Channel List from SPM 135, AP device 200 may default back to auto generation of the AP neighbor scan channel list. On startup, AP device 200 may create a AP Neighbor Scan Channel List and send a PACE event to SPM 135. SPM 135 may monitor PACE Events "Scan Update Neighbor Channel List" from AP device 200, and may choose to override the Neighbor Scan Channel List or leave it as. AP device 200 may continue to update the AP Neighbor Scan Channel List as long as there are not overrides from SPM 135.
  To help AP device 200 auto generate of AP neighbor scan channel list, SPM 135 may publish the list of neighbor APs and BSSID and their current channel, whenever the RRM updates the AP's channel.
  only publish the message to—ap-wifi-neighbor-scan-list for AP's that have Wifi location enabled. NMS 130 may determine whether AP device 200 supports AP Neighbor Scans by monitoring PACE events "Scan Update Neighbor Channel List" from AP device 200.

For instance in this list: AP4 is never in any neighbor scan list
AP1—nbr: AP2, AP3
AP2—nbr: AP1, AP3
AP3—nbr: AP1, AP2
AP4—nbr: AP2, AP3

Figure 3A:
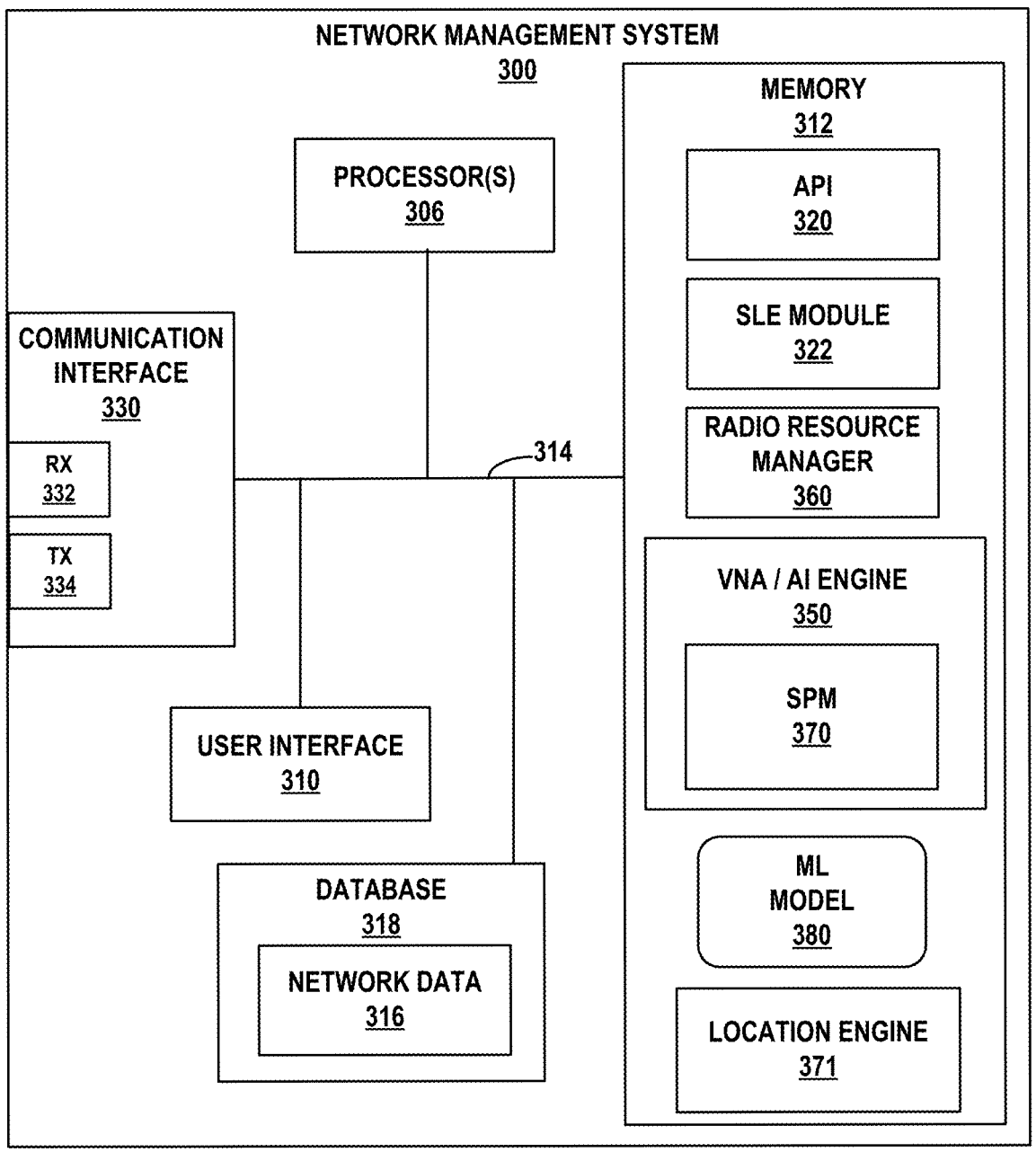
FIGS. 3A and 3B are a block diagrams of an example network management system configured to determine a location of a client device based on received signal samples, in accordance with one or more techniques of the disclosure.
Figure 3B:
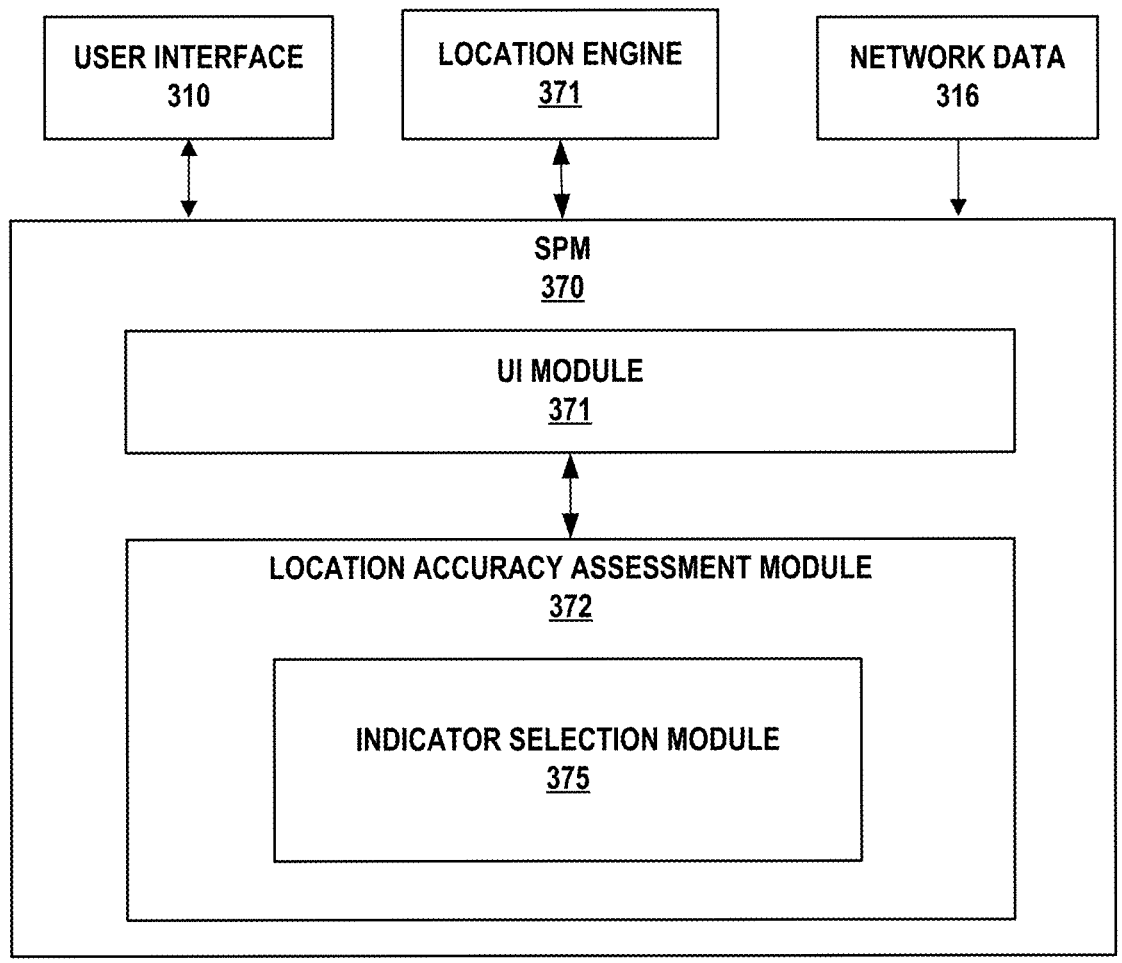

FIGS. 3A and 3B are a block diagrams of an example network management system 300 configured to determine a location of a client device based on received signal samples, in accordance with one or more techniques of the disclosure. NMS 300 may be used to implement, for example, NMS 130 in FIG. 1A. In such examples, NMS 300 is responsible for monitoring and management of one or more wireless networks 106A-106N at sites 102A-102N, respectively. In some examples, NMS 300 receives network data collected by AP devices 142 from UEs 148, such as network data including proximity information used to determine one or more proximity assessments, and analyzes this data for cloud-based management of wireless networks 106A-106N. In some examples, NMS 300 may be part of another server shown in FIG. 1A or a part of any other server.

NMS 300 includes a communications interface 330, one or more processor(s) 306, a user interface 310, a memory 320, and a database 312. The various elements are coupled together via a bus 314 over which the various elements may exchange data and information.

Processor(s) 306 execute software instructions, such as those used to define a software or computer program, stored to a computer-readable storage medium (such as memory 320), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1A, and/or any local area networks. Communications interface 330 includes a receiver 332 and a transmitter 334 by which NMS 300 receives/transmits data and information to/from any of AP devices 142, servers 110, 116, 122, 128 and/or any other devices or systems forming part of network 100 such as shown in FIG. 1A. The data and information received by NMS 300 may include, for example, network data and/or event log data received from access points 142 used by NMS 300 to remotely monitor and/or control the performance of wireless networks 106A-106N. NMS may further transmit data via communications interface 330 to any of network devices such as AP devices 142 at any of network sites 102A-102N to remotely manage wireless networks 106A-106N.

Memory 320 includes one or more devices configured to store programming modules and/or data associated with operation of NMS 300. For example, memory 320 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 320, SLE module 322, a radio resource management (RRM) engine 360, a virtual network assistant (VNA)/AI engine 350, and a machine learning model 380. NMS 300 may also include any other programmed modules, software engines and/or interfaces configured for remote monitoring and management of wireless networks 106A-106N, including remote monitoring and management of any of AP devices 142.

RRM engine 360 monitors one or more metrics for each site 102A-102N in order to learn and optimize the radio-frequency (RF) environment at each site. For example, RRM engine 360 may monitor the coverage and capacity SLE metrics (e.g., managed by SLE module 322) for a wireless network 106 at a site 102 in order to identify potential issues with coverage and/or capacity in the wireless network 106 and to make adjustments to the radio settings of the access points at each site to address the identified issues. RRM engine 360 may determine channel and transmit power distribution across all AP devices 142 in each network 106A-106N. RRM engine 360 may monitor events, power, channel, bandwidth, and number of clients connected to each AP device. RRM engine 360 may measure the strength of a radio signal of client devices, such as an RSSI value. RRM engine 360 may further automatically change or update configurations of one or more AP devices 142 at a site 106 with an aim to improve the coverage and/or capacity SLE metrics and thus to provide an improved wireless experience for the user.

VNA/AI engine 350 analyzes network data received from AP devices 142 as well as its own data to monitor performance of wireless networks 106A-106N. For example, VNA engine 350 may identify when anomalous or abnormal states are encountered in one of wireless networks 106A-106N. VNA/AI engine 350 may use a root cause analysis module (not shown) to identify the root cause of any anomalous or abnormal states. In some examples, the root cause analysis module utilizes artificial intelligence-based techniques to help identify the root cause of any poor SLE metric(s) at one or more of wireless networks 106A-106N. In addition, VNA/AI engine 350 may automatically invoke one or more remedial actions intended to address the identified root cause(s) of one or more poor SLE metrics. Examples of remedial actions that may be automatically invoked by VNA/AI engine 350 may include, but are not limited to, invoking RRM engine 360 to reboot one or more AP devices and/or adjust/modify the transmit power of a specific radio in a specific AP device, adding service set identifier (SSID) configuration to a specific AP device, changing channels on an AP device or a set of AP devices, etc. The remedial actions may further include restarting a switch and/or a router, invoke downloading of new software to an AP device, switch, or router, etc. These remedial actions are given for example purposes only, and the disclosure is not limited in this respect. If automatic remedial actions are not available or do not adequately resolve the root cause, VNA/AI engine 350 may proactively and automatically provide a notification including recommended remedial actions to be taken by IT personnel to address the anomalous or abnormal wireless network operation.

SLE module 322 enables set up and tracking of thresholds for one or more SLE metrics for each of wireless networks 106A-106N. SLE module 322 further analyzes network data (e.g., stored as network data 316 in database 318) collected by AP devices and/or UEs associated with wireless networks 106A-106N, such as any of AP devices 142 from UEs 148 in each wireless network 106A-106N. For example, AP devices 142A-1 through 142A-N collect network data from UEs 148A-1 through 148A-N currently associated with wireless network 106A (e.g., named assets, connected/unconnected WiFi clients). This data, in addition to any network data collected by one or more AP devices 142A-1 through 142A-N in wireless network 106A, is transmitted to NMS 300 and stored as, for example, network data 316.

NMS 300 executes SLE module 322 to determine one or more SLE metrics for each UE 148 associated with a wireless network 106. One or more of the SLE metrics may further be aggregated to each AP device at a site to gain insight into contribution of each AP device to wireless network performance at the site. The SLE metrics track whether the service level for each particular SLE metric meets the configured threshold value(s). In some examples, each SLE metric may further include one or more classifiers. If a metric does not meet the configured SLE threshold value for the site, the failure may be attributed to one of the classifiers to further understand how and/or why the failure occurred.

In accordance with the techniques described in this disclosure, VNA engine 350 includes SPM 370 configured to determine one or more neighboring AP devices of AP devices 142 that are within a certain proximity of an AP device and to generate a packetized scan command for each of the one or more neighboring AP devices. For example, VNA 350 may determine a specific wireless channel assigned to AP device 142A-1, e.g., by radio resource manager 360, on which client devices may connected to AP device 142A-1. In this example, SPM 370 may determine one or more neighboring AP devices of AP devices 142 that are within a certain proximity of AP device 142A-1. For instance, SPM 370 may determine AP device 142A-K is within a certain proximity of AP device 142A-1. SPM 370 may generate a packetized scan command for each of the one or more neighboring AP devices that comprises a scan channel list including at least the specific wireless channel for AP device 142A-1. The scan channel list for a respective neighboring AP device may comprise wireless channels that are not assigned to the respective neighboring AP device. For instance, SPM 370 may generate a packetized scan command for AP device 142-K that includes the specific wireless channel for AP device 142A-1 when AP device 142A-K is not assigned the specific channel for connecting client devices 148 to networks 134.

SPM 370 may send the packetized scan command to each of the one or more neighboring AP devices instructing each of the one or more neighboring AP devices to continuously scan at least the specific wireless channel included in the scan channel list. For instance, SPM 370 may output the packetized scan command to AP device 142A-K instructing AP device 142-K to continuously scan the specific wireless channel. Location engine 371 may receive, from AP device 142-1, one or more signal samples for at least the specific wireless channel assigned to AP device 142A-1. Additionally, location engine 371 may receive, from each of the one or more neighboring AP devices, one or more signal samples for at least the specific wireless channel as included in the scan channel list for the respective one or more neighboring AP devices and not assigned to the respective one or more neighboring AP devices. For example, location engine 371 may receive, from AP device 142A-1 and AP device 142A-K, signal samples for at least the specific wireless channel.

Based on the received signal samples, location engine 371 may determine a location within site 102A of client device 148A-1 connected to AP device 142A-1 on the specific wireless channel. For example, location engine 371 may triangulate the location using an RSSI received from AP devices 142A-1 and 142A-K. For instance, location engine 371 may receive an RSSI value (e.g., decibel-milliwatt (dBm)) for at least the specific wireless channel assigned to AP device 142A-1 from AP devices 142A-1 and 142A-K. In this example, location engine 371 may determine, for each RSSI value, a size (e.g., distance in meters) of a radial zone for client device 148A-1 from the respective AP devices. Location engine 371 may determine an overlap area of the zones generated using each RSSI value to determine the location (e.g., a specific location) of client device 148A-1. SPM 370 may represent an example implementation of SPM 135 of FIG. 1A. A more detailed view of SPM 370 is described and illustrated in FIG. 3B.

In the example of FIG. 3B, SPM 370 may include UI module 371 and location accuracy assessment module 372. Although UI module 371 is illustrated as included in SPM 370, UI module may be a separate module within NMS 300 accessible by SPM 370.

UI module 371 may generate data representative of a user interface including selectable user interface elements representing client devices 148 within a given site. The selectable user interface elements may include a selectable list of client devices 148, selectable user interface elements (e.g., icons) representing client devices 148 overlaid on the mapping of the site or area, or other user interface elements to enable a user to select one or more of the AP client 148 for which to generate the proximity zones.

SPM 370 of NMS 300 may generate, at user interface 310, an indication of UI elements representing one or more of client devices 148. For example, SPM 370 may generate data representative of GUI for display on a computing device, e.g., a computing device of a network administrator of the site. In some examples, the data includes a representation of a map of the site. In response to a determination of the location of client device 148A-1 from the location engine 371, SPM 370 may generate an indicator of client device 148A-1 positioned on a map of site 102A based on the determined location of client device 148A-1. The indicator may be represented using a first color that is different than a second color used to indicate a location of another client device (e.g., client device 148A-K) determined based only on signal samples received from a single AP device. Other indicators may be used.

Location engine 371 may determine a location of client devices 148. SPM 370 includes a location accuracy assessment module 372. Location accuracy assessment module 372 may include indicator selection module 375. Location accuracy assessment module 372 may include some or all of these modules, and may also include other modules for location accuracy assessment of client device 148.

Indicator selection module 375 may select an indicator to identify a location of client device 148 in a representation of a map of the site. While shown in SPM 370, in some examples, indicator selection module 375 may be included in UI module 371. Indicator selection module 375 may select a first color for client device 148A-1 when the location of client device 148A-1 is determined using signal samples received from an AP device of AP devices 142 (e.g., AP device 142A-1) connecting client device 148A-1 to wireless network 106A and signal samples received from at least one other AP device of AP devices 142 (e.g., AP device 142A-K). In this example, indicator selection module 375 may select a second color that is different from the first color for client device 148A-1 when the location of client device 148A-1 is determined using only signal samples received from a single AP device of AP devices 142 (e.g., AP device 142A-1) connecting client device 148A-1 to wireless network 106A.

Figure 4:
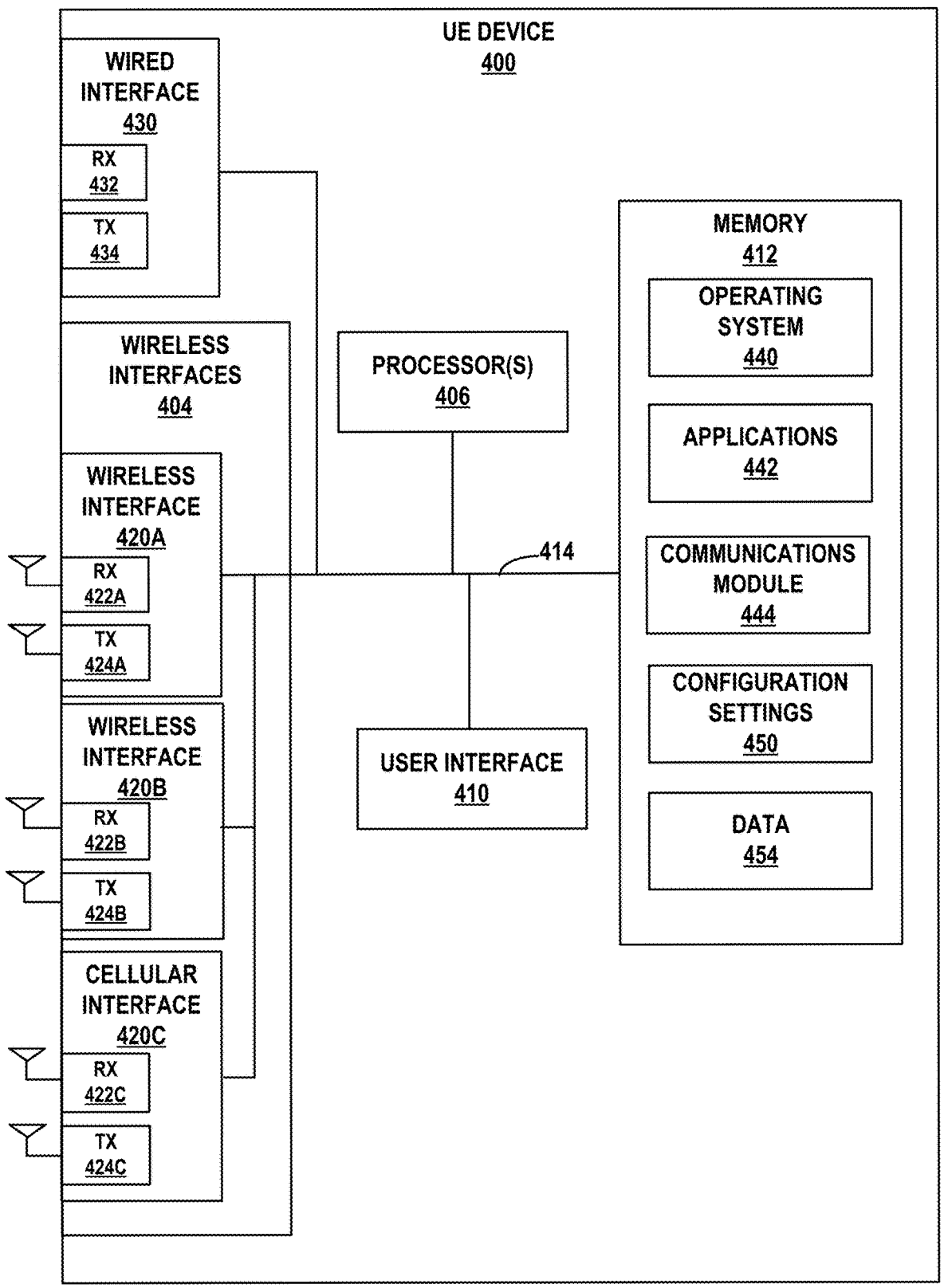
FIG. 4 is a block diagram of an example user equipment device in accordance with one or more techniques of the disclosure.

FIG. 4 shows an example user equipment (UE) device 400. Example UE device 400 shown in FIG. 4 may be used to implement any of UEs 148 as shown and described herein with respect to FIG. 1. UE device 400 may include any type of wireless client device, and the disclosure is not limited in this respect. For example, UE device 400 may include a mobile device such as a smart phone, tablet or laptop computer, a personal digital assistant (PDA), a wireless terminal, a smart watch, a smart ring or any other type of mobile or wearable device. UE 400 may also include any type of IoT client device such as a printer, a security sensor or device, an environmental sensor, or any other connected device configured to communicate over one or more wireless networks.

UE device 400 includes a wired interface 430, wireless interfaces 420A-420C, one or more processor(s) 406, memory 412, and a user interface 410. The various elements are coupled together via a bus 414 over which the various elements may exchange data and information. Wired interface 430 includes a receiver 432 and a transmitter 434. Wired interface 430 may be used, if desired, to couple UE 400 to network(s) 134 of FIG. 1. First, second and third wireless interfaces 420A, 420B, and 420C include receivers 422A, 422B, and 422C, respectively, each including a receive antenna via which UE 400 may receive wireless signals from wireless communications devices, such as AP devices 142 of FIG. 1, AP device 200 of FIG. 2, other UEs 148, or other devices configured for wireless communication. First, second, and third wireless interfaces 420A, 420B, and 420C further include transmitters 424A, 424B, and 424C, respectively, each including transmit antennas via which UE 400 may transmit wireless signals to wireless communications devices, such as AP devices 142 of FIG. 1, AP device 200 of FIG. 2, other UEs 138 and/or other devices configured for wireless communication. In some examples, first wireless interface 420A may include a Wi-Fi 802.11 interface (e.g., 2.4 GHz and/or 5 GHz) and second wireless interface 420B may include a Bluetooth interface and/or a Bluetooth Low Energy interface. Third wireless interface 420C may include, for example, a cellular interface through which UE device 400 may connect to a cellular network.

Processor(s) 406 execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform the techniques described herein.

Memory 412 includes one or more devices configured to store programming modules and/or data associated with operation of UE 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 406 to perform the techniques described herein.

In this example, memory 412 includes an operating system 440, applications 442, a communications module 444, configuration settings 450, and data storage for network data 454. Data storage for network data 454 may include, for example, a status/error log including network data specific to UE 400. As described above, network data 454 may include any network data, events, and/or states that may be related to determination of one or more roaming quality assessments. The network data may include event data such as a log of normal events and error events according to a logging level based on instructions from the network management system (e.g., NMS 150/300). Data storage for network data 454 may store any data used and/or generated by UE 400, such as network data used to determine proximity to a proximity zone, that is collected by UE 400 and transmitted to any of AP devices 138 in a wireless network 106 for further transmission to NMS 150.

Communications module 444 includes program code that, when executed by processor(s) 406, enables UE 400 to communicate using any of wired interface(s) 430, wireless interfaces 420A-420B and/or cellular interface 450C. Configuration settings 450 include any device settings for UE 400 settings for each of wireless interface(s) 420A-420B and/or cellular interface 420C.

Figure 5:
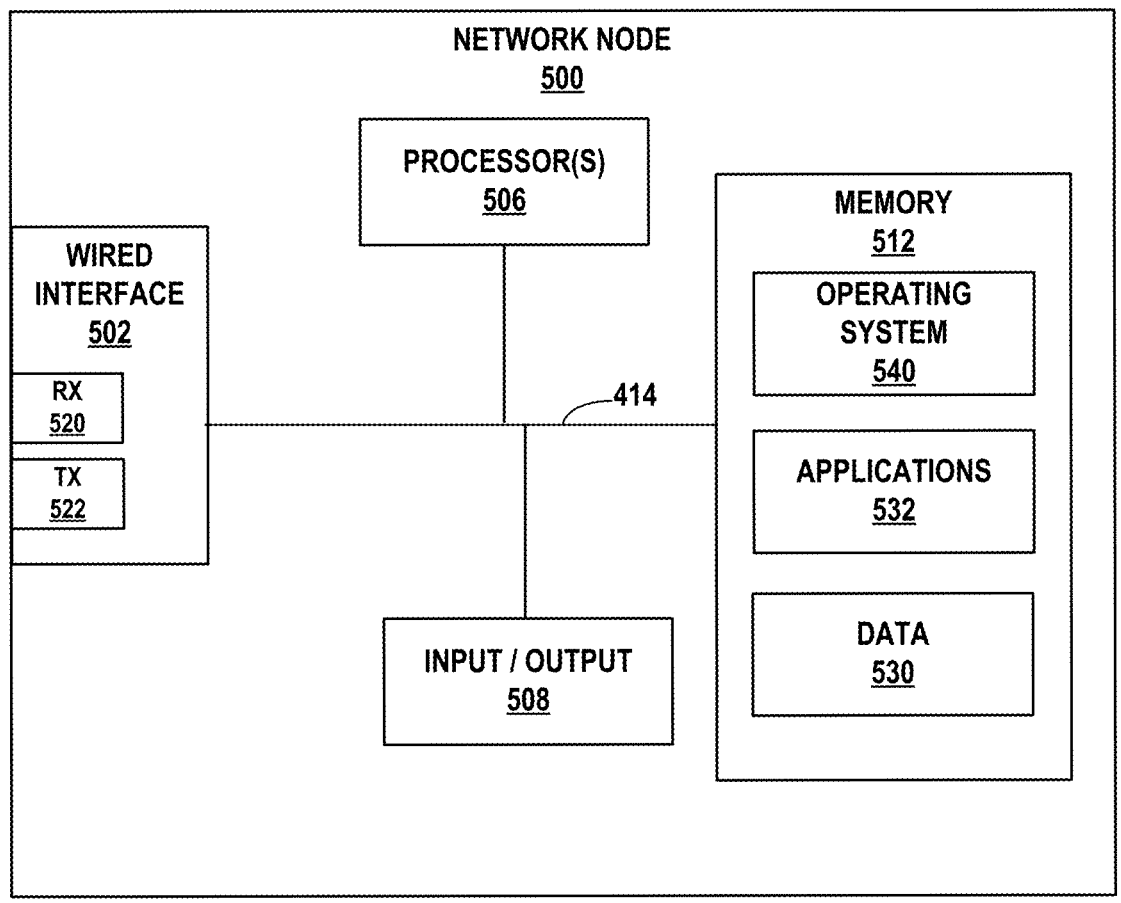
FIG. 5 is a block diagram of an example network node, such as a router or switch, in accordance with one or more techniques of the disclosure.

FIG. 5 is a block diagram illustrating an example network node 500 configured according to the techniques described herein. In one or more examples, the network node 500 implements a device or a server attached to the network 134 of FIG. 1, e.g., router, switch, AAA server 110, DHCP server 116, DNS server 122, VNA 133, Web server 128A-128X, etc., or a network device such as, e.g., routers, switches or the like.

In this example, network node 500 includes a communications interface 502, e.g., an Ethernet interface, a processor 506, input/output 508, e.g., display, buttons, keyboard, keypad, touch screen, mouse, etc., a memory 512 and an assembly of components 516, e.g., assembly of hardware module, e.g., assembly of circuits, coupled together via a bus 509 over which the various elements may interchange data and information. Communications interface 502 couples the network node 500 to a network, such as an enterprise network.

Though only one interface is shown by way of example, those skilled in the art should recognize that network nodes may have multiple communication interfaces. Communications interface 502 includes a receiver 520 via which the network node 500 can receive data and information (e.g., including operation related information such as registration request, AAA services, DHCP requests, Simple Notification Service (SNS) look-ups, and Web page requests). Communications interface 502 includes a transmitter 522, via which the network node 500 can send data and information (e.g., including configuration information, authentication information, web page data, etc.).

Memory 512 stores executable software applications 532, operating system 540 and data/information 530. Data 530 includes system log and/or error log that stores network data and/or proximity information for network node 500 and/or other devices, such as wireless access points, based on a logging level according to instructions from the network management system. Network node 500 may, in some examples, forward the network data to a network management system (e.g., NMS 130 of FIG. 1) for analysis as described herein.

Figure 6:
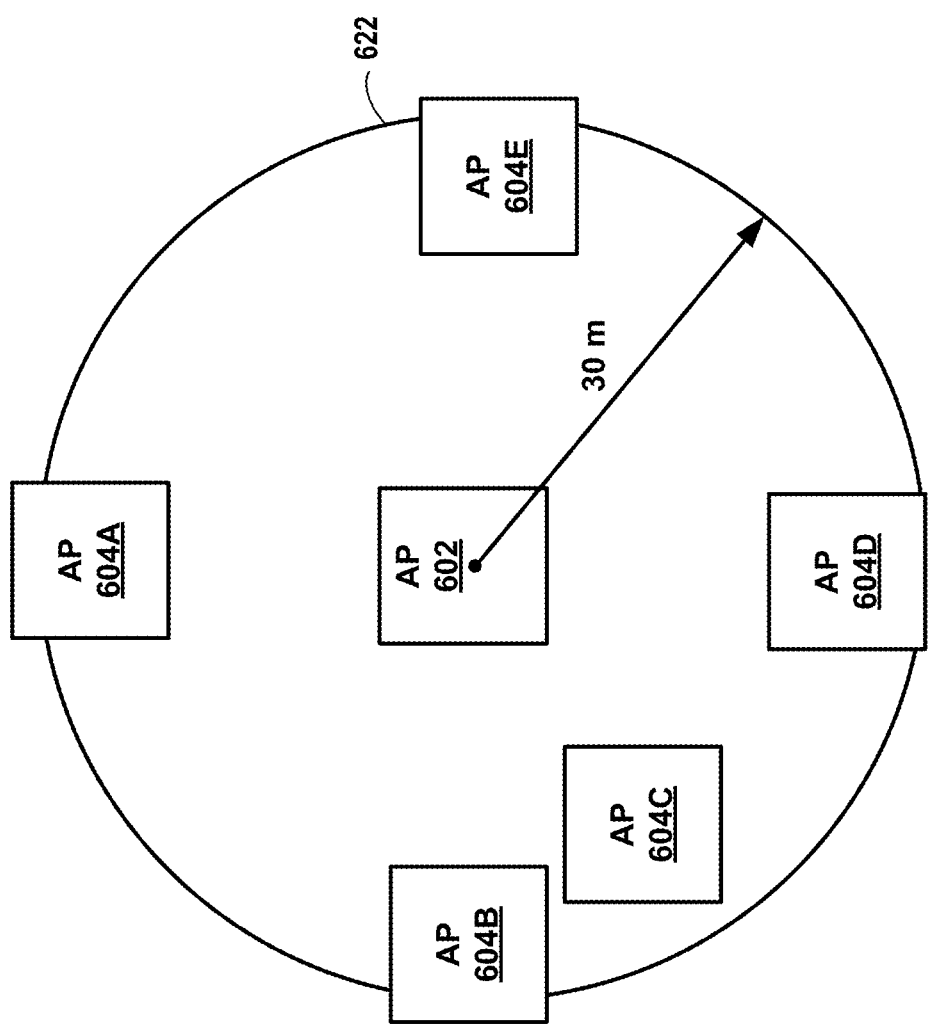
FIG. 6 illustrates an example of one or more AP devices that are within a certain proximity of an AP device, in accordance with the techniques described in this disclosure.

FIG. 6 illustrates an example of one or more AP devices 604A-604E (collectively, AP devices 604) that are within a certain proximity 622 of an AP device 602, in accordance with the techniques described in this disclosure. AP devices 602, 604 may be examples of AP devices 142 of FIG. 1A. In this example, NMS 130 may determine that AP devices 604 are within proximity 622 of AP device 602. While the example of FIG. 6 users a distance of 30 meters for the certain proximity 622 of AP device 602, other distances may be used.

Figure 7:
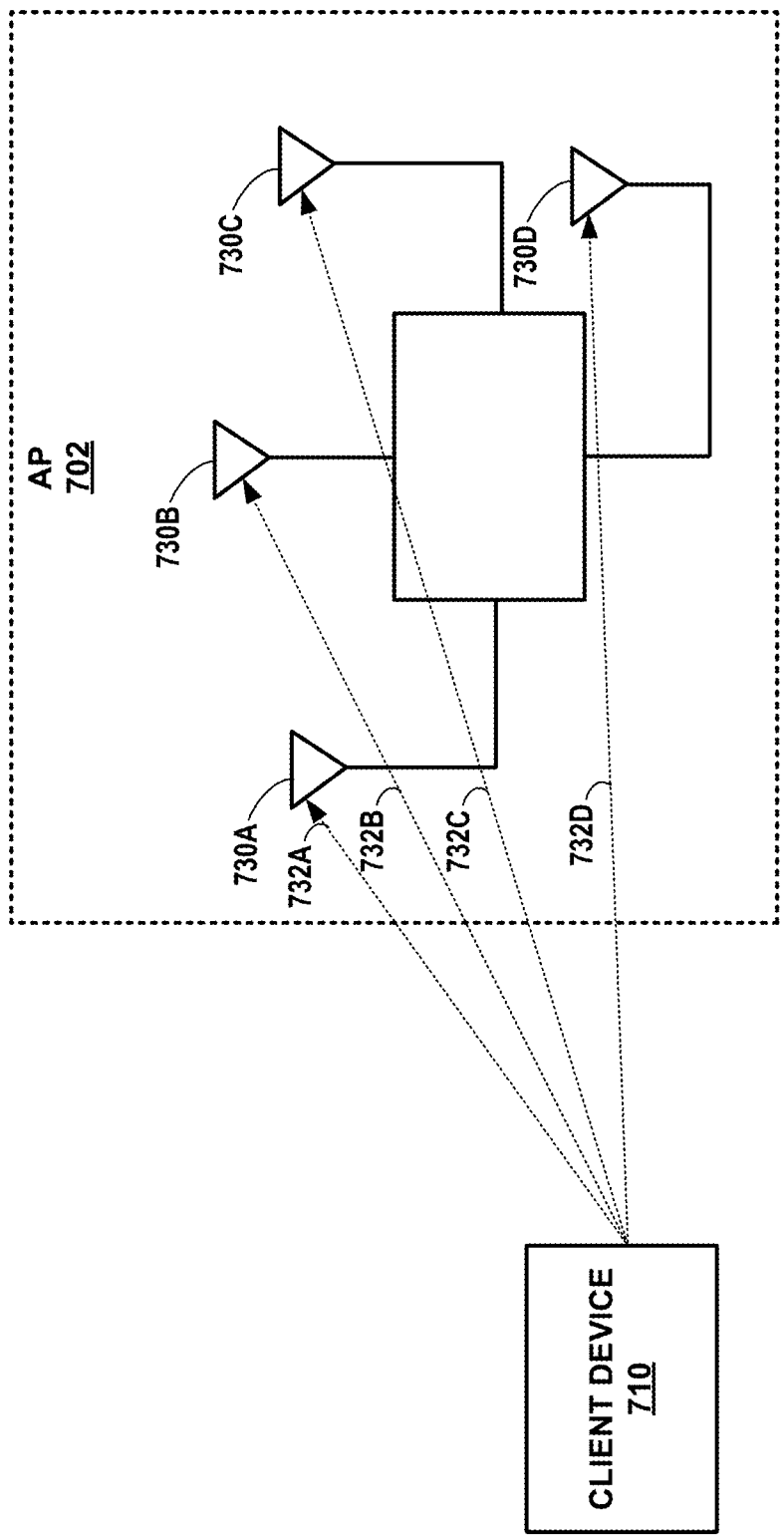
FIG. 7 illustrates an example of antennas of a single AP device, in accordance with the techniques described in this disclosure.

FIG. 7 illustrates an example of antennas 730A-730D of a single AP device 702, in accordance with the techniques described in this disclosure. AP device 702 may be an example of AP devices 142 of FIG. 1A. Client device 710 may be an example of client devices 148 of FIG. 1A.

In th example of FIG. 7, client device 710 may output a signal on a certain wireless channel via which client device 710 is connected to AP 702. In this example, antenna 730A may receive signal 732A, antenna 730B may receive signal 732B, antenna 730C may receive signal 732C, and antenna 730D may receive signal 732D. Each of signals 732A-732D (collectively "signals 732") received by AP 702 may be different from other signals of signals 732 and may be different from the signal original output by client device 710 (e.g., e.g., signals 732 may be attenuated and/or include noise).

AP device 702 may be configured to scan the certain wireless channel and collect signal samples for each of signals 732. For instance, AP device 702 may determine an RSSI value for each sample of signals 732. In this example, AP device 702 or another device, e.g., location engine 371 of NMS 300 of FIG. 3A, may determine an averaged signal sample for AP device 702 based on the signal samples for each of signals 732. For instance, AP device 702 may calculate a mean of the signals samples for each of signals 732.

Figure 8:
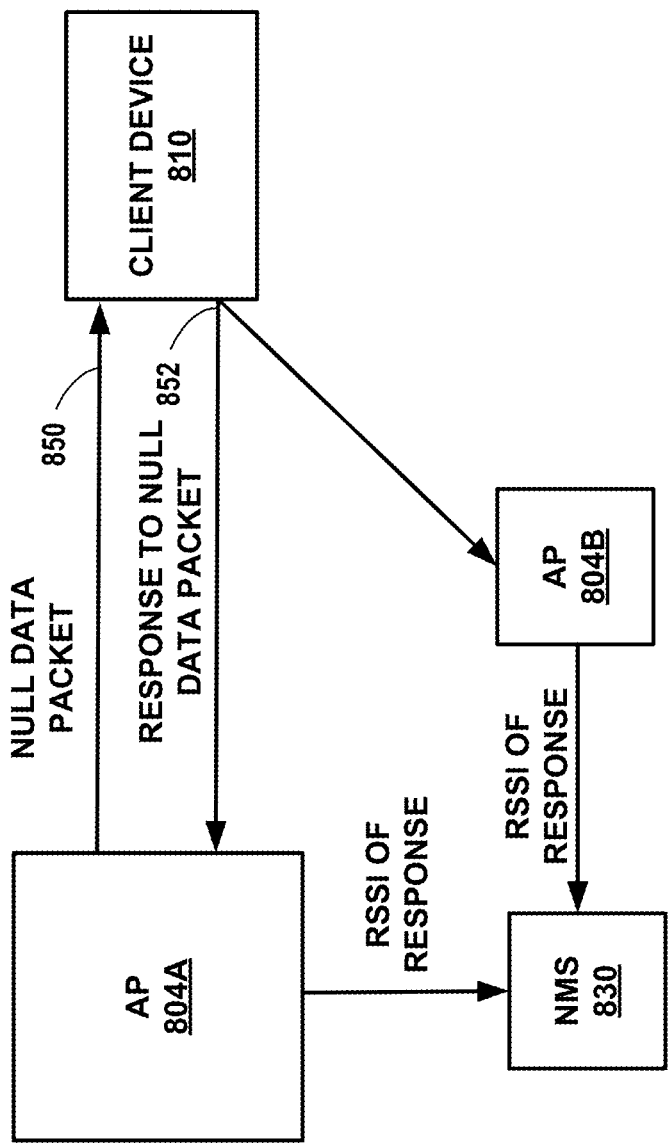
FIG. 8 illustrates an example of a tickling process, in accordance with the techniques described in this disclosure.

FIG. 8 illustrates an example of a tickling process, in accordance with the techniques described in this disclosure. AP device 804A-804B (collectively, AP devices 804) may be examples of AP devices 142 of FIG. 1A and client device 810 may be an example of client devices 148 of FIG. 1A. In the example of FIG. 8, AP 804A and/or NMS 830 may determine that client device 810 has not output a signal within a predetermined time window. In this example, AP 804A may output a null data packet (850) to client 810. In this example, client device 810 may, in response to the null packet, output a signal indicating a response to the null packet (852). AP devices 804 may collect samples of the signal indicating the response to the null data packet and may each generate a signal sample based on the signal. In this example, AP 804A may output an indication of the signal sample (e.g., an RSSI value) detected at AP 804A to a location engine of NMS 830. AP 804B may output an indication of the signal sample (e.g., an RSSI value) detected at AP 804B to the location engine of NMS 830.

Figure 9:
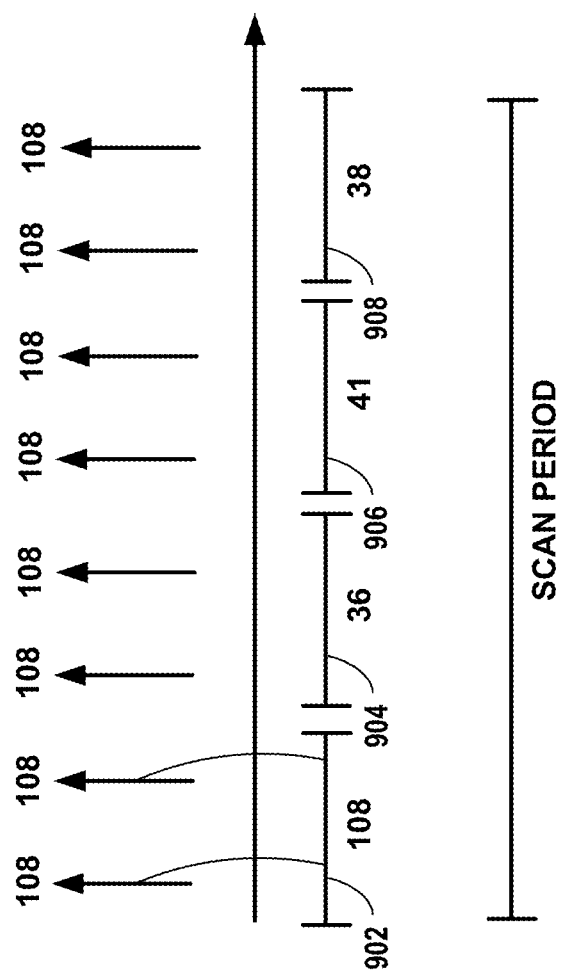
FIG. 9 illustrates an example of scanning multiple channels using a single AP device, in accordance with the techniques described in this disclosure.

FIG. 9 illustrates an example of scanning multiple channels using a single AP device according to a determined scan interval, in accordance with the techniques described in this disclosure. AP devices 142 (and client devices 148) may be configured to change a channel being scanned. As such, AP devices 142 may not be in constant communication on a channel during a scan period.

In the example, AP device 142A-1 is configured to scan channel 108 for first portion 902 (e.g., 300 ms) of a scan period, scan channel 36 for second portion 904 of the scan period, scan channel 41 for third portion 906 of the scan period, and scan channel 38 for fourth portion 908 of the scan period. In this example, a signal at channel 108 may be received at first portion 902 but not received at portions 904-908. As such, AP device 142A-1 may be configured to collect samples for each scan channel according to the determined scan interval for a predetermined amount of time (e.g., 30 seconds) to ensure collection of at least one signal on each scan channel. The process of tickling described in FIG. 8 may help to guarantee that signals are available during each channel's scan time window.

Figure 10:
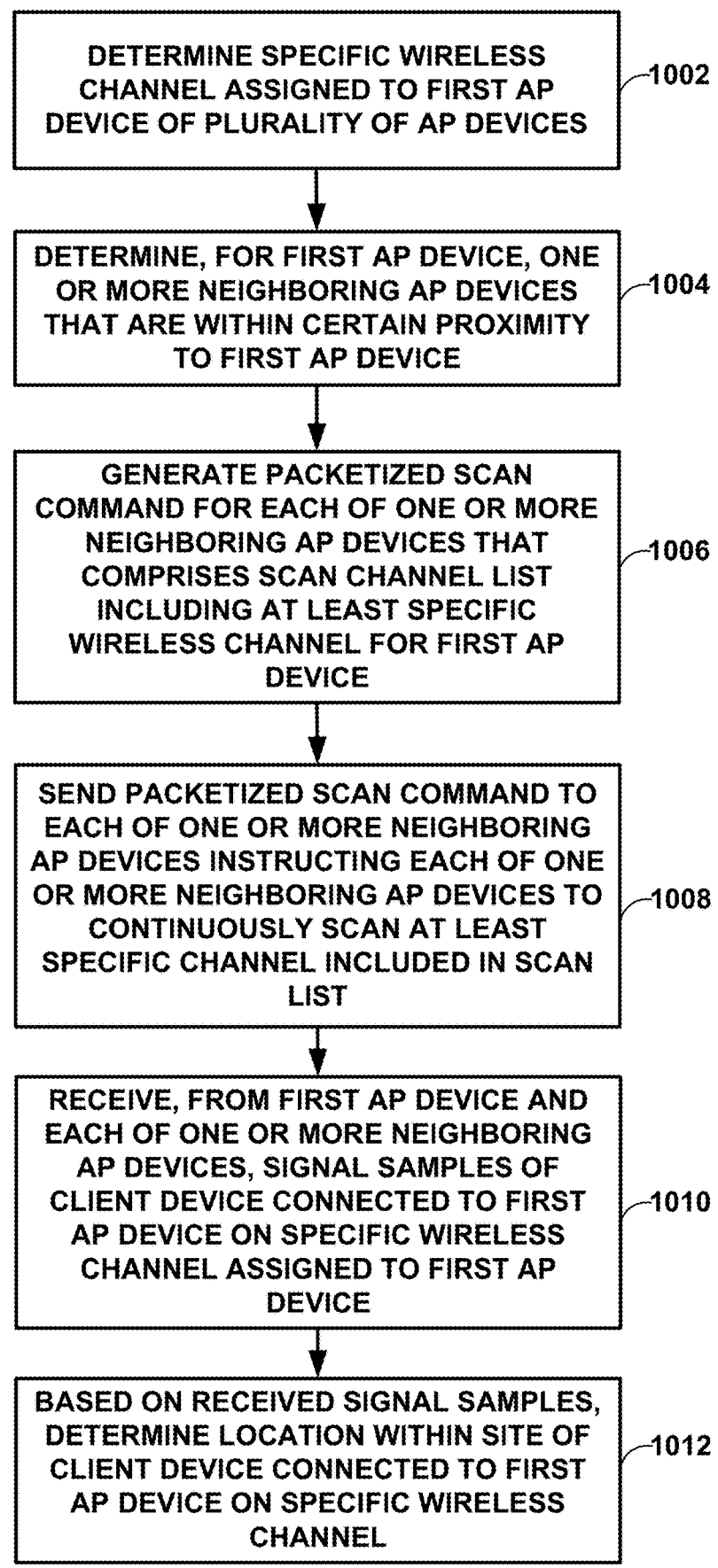
FIG. 10 is a flowchart of an example process by which a network management system determines a location of a client device based on received signal samples, in accordance with one or more techniques of the disclosure.

FIG. 10 is a flowchart of an example process by which a network management system determines a location of a client device based on received signal samples, in accordance with one or more techniques of the disclosure.

In the example of FIG. 10, VNA 133 (e.g., SPM 135) may determine a specific wireless channel assigned to a first AP device of the plurality of AP devices on which client devices may connected to the first AP device (1002). For example, VNA 133 may determine a specific wireless channel assigned (e.g., by RRM 360) to AP device 142A-1 on which a client device, e.g., client device 148A-1, may connected to AP device 142A-1.

SPM 135 may determine, for the first AP device, one or more neighboring AP devices that are within a certain proximity of the first AP device (1004). For example, SPM 135 may determine one or more neighboring AP devices of AP devices 142 that are within a certain proximity of AP device 142A-1. For instance, SPM 135 may determine AP device 142A-K is within a certain proximity (e.g., 30 m) of AP device 142A-1.

SPM 135 may generate a packetized scan command for each of the one or more neighboring AP devices that comprises a scan channel list including at least the specific wireless channel for the first AP device (1006). For example, SPM 135 may generate a packetized scan command for each of the one or more neighboring AP devices that comprises a scan channel list including at least the specific wireless channel for AP device 142A-1. The scan channel list for a respective neighboring AP device may comprise wireless channels that are not assigned to the respective neighboring AP device. For instance, SPM 135 may generate a packetized scan command for AP device 142A-K that includes the specific wireless channel for AP device 142A-1 when AP device 142A-K is not assigned the specific channel for connecting client devices 148 to networks 134.

In some examples, SPM 135 may generate a unique packetized scan command for one or more of AP devices 142. For example, SPM 135 may generate a first packetized scan command for a first neighboring AP device of the one or more neighboring AP devices that comprises a respective scan channel list for the first neighboring AP device including the specific wireless channel for the first AP device and at least a first wireless channel different from the specific wireless channel. In this example, SPM 135 may generate a second packetized scan command for a second neighboring AP device of the one or more neighboring AP devices that comprises a respective scan channel list for the second neighboring AP device including the specific wireless channel for the first AP device and at least a second wireless channel different from the specific wireless channel and different from the first wireless channel.

In some examples, SPM 135 may update a scan channel list, e.g., in scenarios where RRM 360 has reassigned wireless channels to the AP devices within the site. For example, SPM 135 may generate the packetized scan command for a neighboring AP device of the one or more neighboring AP devices to update an existing scan channel list to an updated scan channel list. In this example, SPM 135 may send the packetized scan command to the neighboring AP device instructing the neighboring AP device to continuously scan at least the specific wireless channel included in the updated scan channel list.

SPM 135 may send the packetized scan command to each of the one or more neighboring AP devices instructing each of the one or more neighboring AP devices to continuously scan at least the specific wireless channel included in the scan channel list (1008). For example, SPM 135 may send the packetized scan command to each of the one or more neighboring AP devices instructing each of the one or more neighboring AP devices to continuously scan at least the specific wireless channel included in the scan channel list. For instance, SPM 135 may output the packetized scan command to AP device 142A-K instructing AP device 142-K to continuously scan the specific wireless channel. SPM 135 may output the packetized scan command with a scan interval. For instance, SPM 135 may cause AP device 142-K to continuously each channel in the scan channel list for the neighboring AP device according to a scan interval (see FIG. 9).

Location engine 136 may receive, from the first AP device and each of the one or more neighboring AP devices, signal samples for at least the specific wireless channel assigned to the first AP device (1010). For example, location engine 136 may receive, from AP device 142-1 and each of the one or more neighboring AP devices, signal samples for at least the specific wireless channel assigned to AP device 142A-1. For example, location engine 136 may receive, from AP device 142A-1 and AP device 142A-K, signal samples for at least the specific wireless channel assigned to AP device 142A-1. AP devices 142 may aggregate the signal samples over a period of time (e.g., 30 seconds). In some examples, SPM 135 perform a tickling process. For instance, SPM 135 may instruct AP device 142A-1 to send a null packet to client device 142A-1.

Based on the received signal samples, location engine 136 may determine a location within the site of the client device connected to the first AP device on the specific wireless channel (1012). Based on the received signal samples, location engine 136 may determine a location within site 102A of client device 148A-1 connected to AP device 142A-1 on the specific wireless channel. For example, location engine 136 may triangulate the location using an RSSI received from AP devices 142A-1 through 142A-K. For instance, location engine 136 may receive an RSSI value (e.g., decibel-milliwatt (dBm)) for at least the specific wireless channel assigned to AP device 142A-K from AP devices 142A-1 and 142A-K. In this example, SPM 135 may determine, for each RSSI value, a size (e.g., distance in meters) of a radial zone for client device 148A-1 for each respective AP device. Location engine 136 may determine an overlap area of the radial zones generated using each RSSI value to determine the location (e.g., a specific location) of client device 148A-1.

SPM 135 may generate data representative of a graphical user interface (GUI) for display on a computing device. The data may include a representation of a map of site 102. In response to a determination of the location of client device 148A-1, SPM 135 may generate an indicator of client device 148A-1 positioned on the map of the site based on the determined location of client device 148A-1. The indicator may be represented using a first identifier that is different than a second identifier used to indicate a location of another client device of client devices 148 determined based only on signal samples received from a single AP device of AP devices 142. For example, the first identifier may comprise a first color that is different than a second color of the second identifier.

The techniques described herein may be implemented using software, hardware and/or a combination of software and hardware. Various examples are directed to apparatus, e.g., mobile nodes, mobile wireless terminals, base stations, e.g., access points, communications system. Various examples are also directed to methods, e.g., method of controlling and/or operating a communications device, e.g., wireless terminals (UEs), base stations, control nodes, access points and/or communications systems. Various examples are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of example approaches. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

In various examples devices and nodes described herein are implemented using one or more modules to perform the steps corresponding to one or more methods, for example, signal generation, transmitting, processing, and/or receiving steps. Thus, in some examples various features are implemented using modules. Such modules may be implemented using software, hardware or a combination of software and hardware. In some examples each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various examples are directed to a machine-readable medium e.g., a non-transitory computer readable medium, including machine executable instructions for causing a machine, e.g., processor and associated hardware, to perform one or more of the steps of the above-described method(s). Some examples are directed to a device including a processor configured to implement one, multiple, or all of the steps of one or more methods of the one example aspect.

In some examples, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all examples are directed to a communications device, e.g., user equipment, with a processor which includes a module corresponding to each of the steps of the various described methods performed by the device in which the processor is included. In some but not all examples a communications device includes a module corresponding to each of the steps of the various described methods performed by the device in which the processor is included. The modules may be implemented purely in hardware, e.g., as circuits, or may be implemented using software and/or hardware or a combination of software and hardware.

Some examples are directed to a computer program product comprising a computer-readable medium comprising code for causing a computer, or multiple computers, to implement various functions, steps, acts and/or operations, e.g. one or more steps described above. In some examples, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some examples are directed to a processor configured to implement one or more of the various functions, steps, acts and/or operations of one or more methods described above. Accordingly, some examples are directed to a processor, e.g., CPU, graphical processing unit (GPU), digital signal processing (DSP) unit, etc., configured to implement some or all of the steps of the methods described herein. The processor may be for use in, e.g., a communications device or other device described in the present application.

Numerous additional variations on the methods and apparatus of the various examples described above will be apparent to those skilled in the art in view of the above description. Such variations are to be considered within the scope of this disclosure. The methods and apparatus may be, and in various examples are, used with BLE, LTE, CDMA, orthogonal frequency division multiplexing (OFDM), and/or various other types of communications techniques which may be used to provide wireless communications links between access nodes and mobile nodes. In some examples the access nodes are implemented as base stations which establish communications links with user equipment devices, e.g., mobile nodes, using OFDM and/or CDMA. In various examples the mobile nodes are implemented as notebook computers, personal data assistants (PDAs), or other portable devices including receiver/transmitter circuits and logic and/or routines, for implementing the methods.

In the detailed description, numerous specific details are set forth in order to provide a thorough understanding of some examples. However, it will be understood by persons of ordinary skill in the art that some examples may be practiced without these specific details. In other instances, well-known methods, procedures, components, units and/or circuits have not been described in detail so as not to obscure the discussion.

Some examples may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some examples may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11 ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some examples may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some examples may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other examples may be used in various other devices, systems and/or networks.

Some demonstrative examples may be used in conjunction with a WLAN (Wireless Local Area Network), e.g., a Wi-Fi network. Other examples may be used in conjunction with any other suitable wireless communication network, for example, a wireless area network, a "piconet", a WPAN, a WVAN, and the like.

Some examples may be used in conjunction with a wireless communication network communicating over a frequency band of 2.4 Ghz, 5 GHz and/or 60 GHz. However, other examples may be implemented utilizing any other suitable wireless communication frequency band(s), for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, and as discussed, the technology may be useful in the unlicensed spectrum.

Although examples are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although examples are not limited in this regard, the terms "plurality" and "a plurality" as used herein may include, for example, "multiple" or "two or more." The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The examples have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the examples illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links, including any communications channel(s)/elements/lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the examples described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The examples are described in relation to enhanced communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The example systems and methods are described in relation to IEEE 802.11 and/or Bluetooth® and/or Bluetooth®

Low Energy transceivers and associated communication hardware, software and communication channels. However, to avoid unnecessarily obscuring the present disclosure, the following description omits well-known structures and devices that may be shown in block diagram form or otherwise summarized.

While the above-described flowcharts have been discussed in relation to a particular sequence of events, it should be appreciated that changes to this sequence can occur without materially effecting the operation of the example(s). Additionally, the example techniques illustrated herein are not limited to the specifically illustrated examples but can also be utilized with the other examples and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the examples is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed techniques may be readily implemented in software and/or firmware that can be stored on a storage medium to improve the performance of a programmed general-purpose computer with the cooperation of a controller and memory, a special purpose computer, a microprocessor, or the like. In these instances, the systems and methods can be implemented as program embedded on personal computer such as an applet, JAVA, RTM, or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there have at least been provided systems and methods for enhancing and improving conversational user interface. Many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. A system comprising:
   a plurality of access point (AP) devices configured to provide a wireless network at a site; and
   a network management system (NMS) that manages the plurality of AP devices, the NMS comprising:
   a memory storing network data received from the plurality of AP devices; and
   one or more processors coupled to the memory and configured to:
   determine a specific wireless channel assigned to a first AP device of the plurality of AP devices for providing the wireless network;
   determine, for the first AP device, one or more neighboring AP devices that are within a certain proximity of the first AP device;
   generate, based on one or more of a geometrical proximity of the one or more neighboring AP devices or a wireless channel set assigned to the one or more neighboring AP devices, a packetized scan command for each of the one or more neighboring AP devices instructing a respective neighboring AP device of the one or more neighboring AP devices to generate one or more signal samples for each channel in a respective scan channel list that includes at least the specific wireless channel assigned to the first AP device, wherein the specific wireless channel is not assigned to the one or more neighboring AP devices for providing the wireless network;
   for each packetized scan command, send the packetized scan command to a respective one of the one or more neighboring AP devices;

receive, from the first AP device and each of the one or more neighboring AP devices, signal samples of a client device connected to the first AP device on the specific wireless channel assigned to the first AP device; and based on the received signal samples, determine a location within the site of the client device connected to the first AP device on the specific wireless channel.

2. The system of claim 1, wherein the one or more processors are configured to:

generate data representative of a graphical user interface (GUI) for display on a computing device, wherein the data includes a representation of a map of the site; and in response to determining the location of the client device, generate an indicator of the client device positioned on the map of the site based on the determined location of the client device within the site, wherein the indicator is represented using a first identifier that is different than a second identifier used to indicate a location of another client device within the site determined based only on signal samples received from a single AP device to which the another client device is connected.

3. The system of claim 2, wherein the first identifier comprises a first color that is different than a second color of the second identifier.

4. The system of claim 1, wherein, to generate the packetized scan command for each of the one or more neighboring AP devices, the one or more processors are configured to:

generate a first packetized scan command for a first neighboring AP device of the one or more neighboring AP devices that comprises a respective scan channel list for the first neighboring AP device including the specific wireless channel for the first AP device and at least a first wireless channel different from the specific wireless channel; and generate a second packetized scan command for a second neighboring AP device of the one or more neighboring AP devices that comprises a respective scan channel list for the second neighboring AP device including the specific wireless channel for the first AP device and at least a second wireless channel different from the specific wireless channel and different from the first wireless channel.

5. The system of claim 1, wherein, to generate the packetized scan command for each of the one or more neighboring AP devices, the one or more processors are configured to generate the packetized scan command for a neighboring AP device of the one or more neighboring AP devices to update an existing scan channel list to an updated scan channel list; and wherein, to send the packetized scan command, the one or more processors are configured to send the packetized scan command to the neighboring AP device instructing the neighboring AP device to continuously scan at least the specific wireless channel included in the updated scan channel list.

6. The system of claim 1, wherein a neighboring AP device of the one or more neighboring AP devices is configured to aggregate a plurality of signal samples collected during a period of time to generate the signal samples of the client device; and wherein the one or more processors are configured to average the signal samples of the client device that are collected by the neighboring AP device during the period of time.

7. The system of claim 6, wherein the period of time is 30 seconds.

8. The system of claim 1, wherein the one or more processors are configured to instruct the first AP device to send a null packet to the client device.

9. The system of claim 1, wherein a neighboring AP device of the one or more neighboring AP devices is configured to continuously scan each channel in the scan channel list for the neighboring AP device according to a scan interval.

10. The system of claim 1, wherein a servicing radio of the first AP device is configured to provide one or more client devices access to the wireless network using the specific wireless channel, wherein the one or more client devices includes the client device connected to the first AP device on the specific wireless channel assigned to the first AP device;

wherein a servicing radio of a particular neighboring AP device of the one or more neighboring AP devices is configured to provide the one or more client devices access to the wireless network using an assigned wireless channel that is different from the specific wireless channel; and wherein to generate the packetized scan command for each of the one or more neighboring AP devices, the one or more processors are configured to generate the packetized scan command for the particular neighboring AP device instructing a monitoring radio of the particular neighboring AP device to continuously scan the specific wireless channel for reception only.

11. The system of claim 1, wherein a radio resource manager (RRM) assigns the specific wireless channel to the first AP device and wherein the RRM assigns a particular neighboring AP device of the one or more neighboring AP devices an assigned wireless channel that is different from the specific wireless channel.

12. A method comprising:

determining, with one or more processors of a network management system, a specific wireless channel assigned to a first AP device of a plurality of AP devices configured to provide a wireless network at a site;

determining, with the one or more processors, for the first AP device, one or more neighboring AP devices that are within a certain proximity of the first AP device;

generating, with the one or more processors and based on one or more of a geometrical proximity of the one or more neighboring AP devices or a wireless channel set assigned to the one or more neighboring AP devices, a packetized scan command for each of the one or more neighboring AP devices instructing a respective neighboring AP device of the one or more neighboring AP devices to generate one or more signal samples for each channel in a respective scan channel list that includes at least the specific wireless channel assigned to the first AP device, wherein the specific wireless channel is not assigned to the one or more neighboring AP devices for providing the wireless network;

sending, with the one or more processors and for packetized scan command, the packetized scan command to a respective one each of the one or more neighboring AP devices;

receiving, with the one or more processors, from the first AP device and each of the one or more neighboring AP devices, signal samples of a client device connected to the first AP device on the specific wireless channel assigned to the first AP device; and based on the received signal samples, determining, with the one or more processors, a location within the site of the client device connected to the first AP device on the specific wireless channel.

13. The method of claim 12, further comprising:

generating, with the one or more processors, data representative of a graphical user interface (GUI) for display on a computing device, wherein the data includes a representation of a map of the site; and in response to determining the location of the client device, generating, with the one or more processors, an indicator of the client device positioned on the map of the site based on the determined location of the client device within the site, wherein the indicator is represented using a first identifier that is different than a second identifier used to indicate a location of another client device within the site determined based only on signal samples received from a single AP device to which the another client device is connected.

14. The method of claim 13, wherein the first identifier comprises a first color that is different than a second color of the second identifier.

15. The method of claim 12, wherein generating the packetized scan command for each of the one or more neighboring AP devices comprises:

generating a first packetized scan command for a first neighboring AP device of the one or more neighboring AP devices that comprises a respective scan channel list for the first neighboring AP device including the specific wireless channel for the first AP device and at least a first wireless channel different from the specific wireless channel; and generating a second packetized scan command for a second neighboring AP device of the one or more neighboring AP devices that comprises a respective scan channel list for the second neighboring AP device including the specific wireless channel for the first AP device and at least a second wireless channel different from the specific wireless channel and different from the first wireless channel.

16. The method of claim 12, wherein generating the packetized scan command for each of the one or more neighboring AP devices comprises generating the packetized scan command for a neighboring AP device of the one or more neighboring AP devices to update an existing scan channel list to an updated scan channel list; and wherein sending the packetized scan command comprises sending the packetized scan command to the neighboring AP device instructing the neighboring AP device to continuously scan at least the specific wireless channel included in the updated scan channel list.

17. The method of claim 12, wherein receiving the signal samples comprises receiving, from a neighboring AP device of the one or more neighboring AP devices, an aggregated plurality of signal samples collected during a period of time; and wherein determining the location comprise averaging the aggregated plurality of signal samples that are collected by the neighboring AP device during the period of time.

18. The method of claim 12, wherein a neighboring AP device of the one or more neighboring AP devices is configured to continuously scan each channel in the scan channel list for the neighboring AP device according to a scan interval.

19. Non-transitory computer-readable storage media comprising instructions that, when executed, configure processing circuitry to:

determine a specific wireless channel assigned to a first AP device of a plurality of AP devices configured to provide a wireless network at a site;

determine, for the first AP device, one or more neighboring AP devices that are within a certain proximity of the first AP device;

generate, based on one or more of a geometrical proximity of the one or more neighboring AP devices or a wireless channel set assigned to the one or more neighboring AP devices, a packetized scan command for each of the one or more neighboring AP devices instructing a respective neighboring AP device of the one or more neighboring AP devices to generate one or more signal samples for each channel in a respective scan channel list that includes at least the specific wireless channel assigned to the first AP device, wherein the specific wireless channel is not assigned to the one or more neighboring AP devices for providing the wireless network;

for each packetized scan command, send the packetized scan command to a respective one of the one or more neighboring AP devices;

receive, from the first AP device and each of the one or more neighboring AP devices, signal samples of a client device connected to the first AP device on the specific wireless channel assigned to the first AP device; and based on the received signal samples, determine a location within the site of the client device connected to the first AP device on the specific wireless channel.

20. The non-transitory computer-readable storage media of claim 19, wherein the instructions further cause the processing circuitry to:

generate data representative of a graphical user interface (GUI) for display on a computing device, wherein the data includes a representation of a map of the site; and in response to determining the location of the client device, generate an indicator of the client device positioned on the map of the site based on the determined location of the client device within the site, wherein the indicator is represented using a first identifier that is different than a second identifier used to indicate a location of another client device within the site determined based only on signal samples received from a single AP device to which the another client device is connected.

* * * * *